United States Patent
Chun et al.

(10) Patent No.: US 10,986,660 B2
(45) Date of Patent: *Apr. 20, 2021

(54) DATA TRANSMISSION METHOD IN WIRELESS COMMUNICATION SYSTEM AND DEVICE THEREFOR

(71) Applicant: LG ELECTRONICS INC., Seoul (KR)

(72) Inventors: Jinyoung Chun, Seoul (KR); Kiseon Ryu, Seoul (KR); Wookbong Lee, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/508,237

(22) Filed: Jul. 10, 2019

(65) Prior Publication Data

US 2020/0045723 A1 Feb. 6, 2020

Related U.S. Application Data

(63) Continuation of application No. 15/527,692, filed as application No. PCT/KR2015/012917 on Nov. 30, 2015, now Pat. No. 10,405,338.

(Continued)

(51) Int. Cl.
*H04L 12/50* (2006.01)
*H04W 72/12* (2009.01)
(Continued)

(52) U.S. Cl.
CPC ....... *H04W 72/1284* (2013.01); *H04L 5/0053* (2013.01); *H04L 5/0091* (2013.01);
(Continued)

(58) Field of Classification Search
CPC ...................................................... H04L 12/28
(Continued)

(56) References Cited

U.S. PATENT DOCUMENTS 9,641,234 B2   5/2017   Moon et al.
10,075,269 B2  9/2018   Chun et al.
(Continued)

FOREIGN PATENT DOCUMENTS

WO   2014087043   6/2014
WO   2014107031   7/2014
(Continued)

OTHER PUBLICATIONS

PCT International Application No. PCT/KR2015/012917, International Search Report dated Feb. 24, 2016, 2 pages.
(Continued)

*Primary Examiner* — Dang T Ton
(74) *Attorney, Agent, or Firm* — Lee Hong Degerman Kang & Waimey

(57) ABSTRACT

Disclosed is an uplink (UL) multi-user (MU) transmission method by a station (STA) in a wireless LAN (WLAN) system. The uplink multi-user transmission method by an STA in a WLAN system according to the present invention includes the steps of: receiving a trigger frame including resource unit allocation information for orthogonal frequency division multiple access (OFDMA) transmission; transmitting a UL MU physical protocol data unit (PPDU) frame, on the basis of frequency resource allocation information; and receiving an ACK frame for the UL MU PPDU.

10 Claims, 15 Drawing Sheets

Related U.S. Application Data

(60) Provisional application No. 62/109,622, filed on Jan. 30, 2015, provisional application No. 62/089,243, filed on Dec. 9, 2014, provisional application No. 62/087,809, filed on Dec. 5, 2014.

(51) Int. Cl.
*H04L 5/00* (2006.01)
*H04W 72/04* (2009.01)
*H04W 74/00* (2009.01)
*H04W 74/08* (2009.01)

(52) U.S. Cl.
CPC ..... *H04W 72/042* (2013.01); *H04W 72/0413* (2013.01); *H04W 72/1289* (2013.01); *H04W 74/006* (2013.01); *H04W 74/0833* (2013.01)

(58) Field of Classification Search
USPC .......................................................... 370/329
See application file for complete search history.

(56) References Cited

U.S. PATENT DOCUMENTS

| | | |
|---|---|---|
| 2014/0079016 A1 | 3/2014 | Dai et al. |
| 2018/0020460 A1* | 1/2018 | Hedayat ............... H04L 27/2607 |
| 2018/0176929 A1* | 6/2018 | Ryu ....................... H04L 5/0094 |
| 2018/0310330 A1 | 10/2018 | Chun et al. |

FOREIGN PATENT DOCUMENTS

| | | |
|---|---|---|
| WO | 2014130702 | 8/2014 |
| WO | 2014171788 | 10/2014 |
| WO | 2014172198 | 10/2014 |
| WO | 2014182065 | 11/2014 |
| WO | 2014182137 | 11/2014 |

OTHER PUBLICATIONS

United States Patent and Trademark Office U.S. Appl. No. 15/527,692, Office Action dated Dec. 3, 2018, 18 pages.
European Patent Office Application Serial No. 15864893.1, Search Report dated Jul. 16, 2018, 7 pages.

* cited by examiner

【Figure 1】
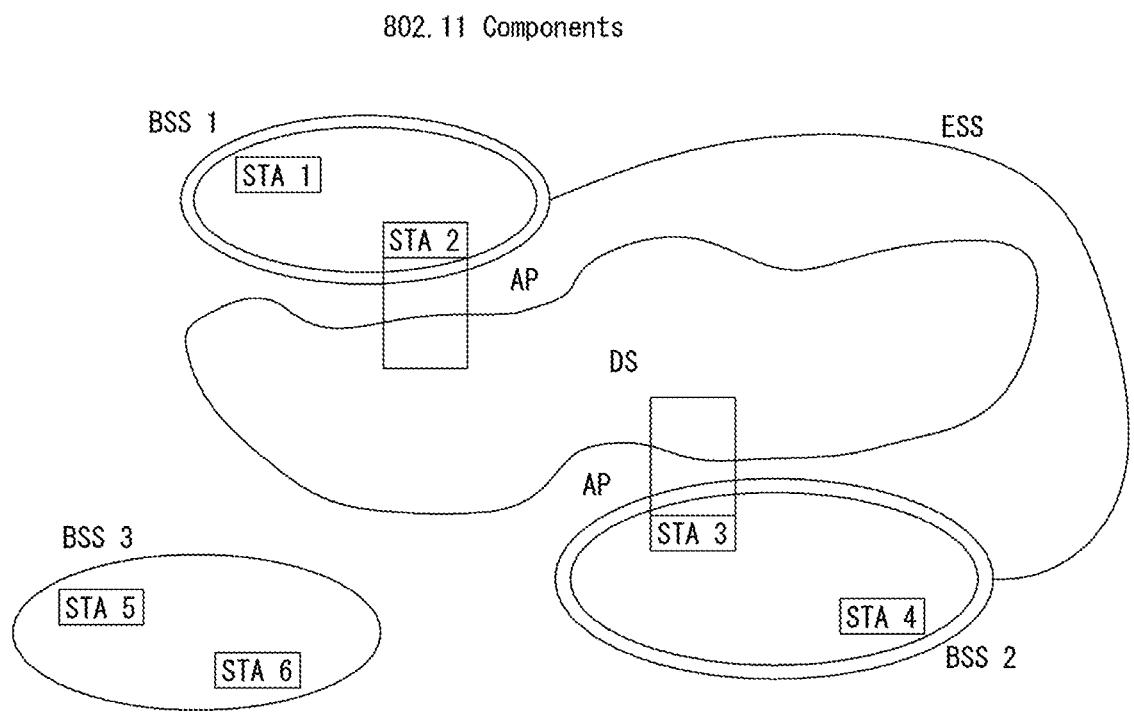
【Figure 2】
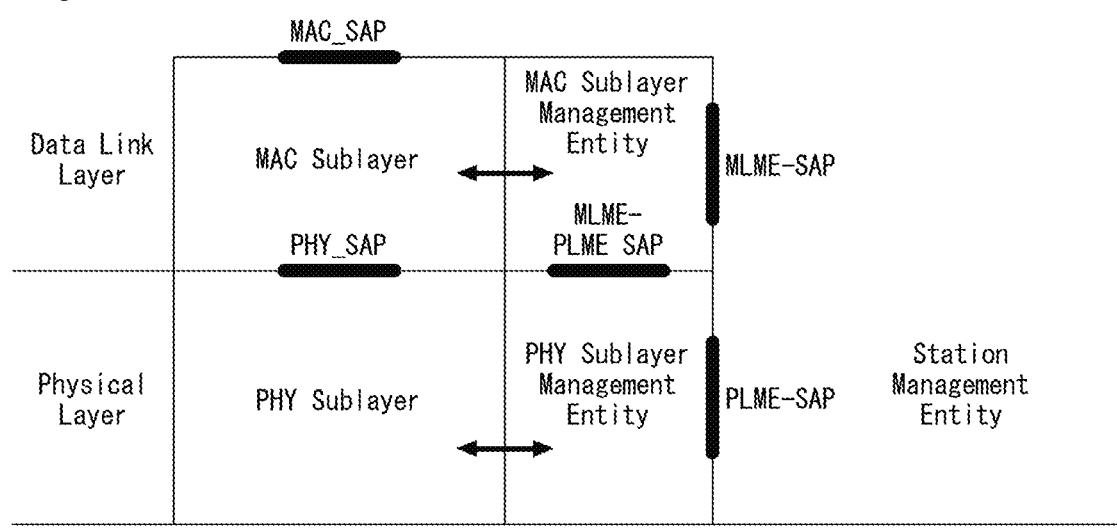

[Figure 3]
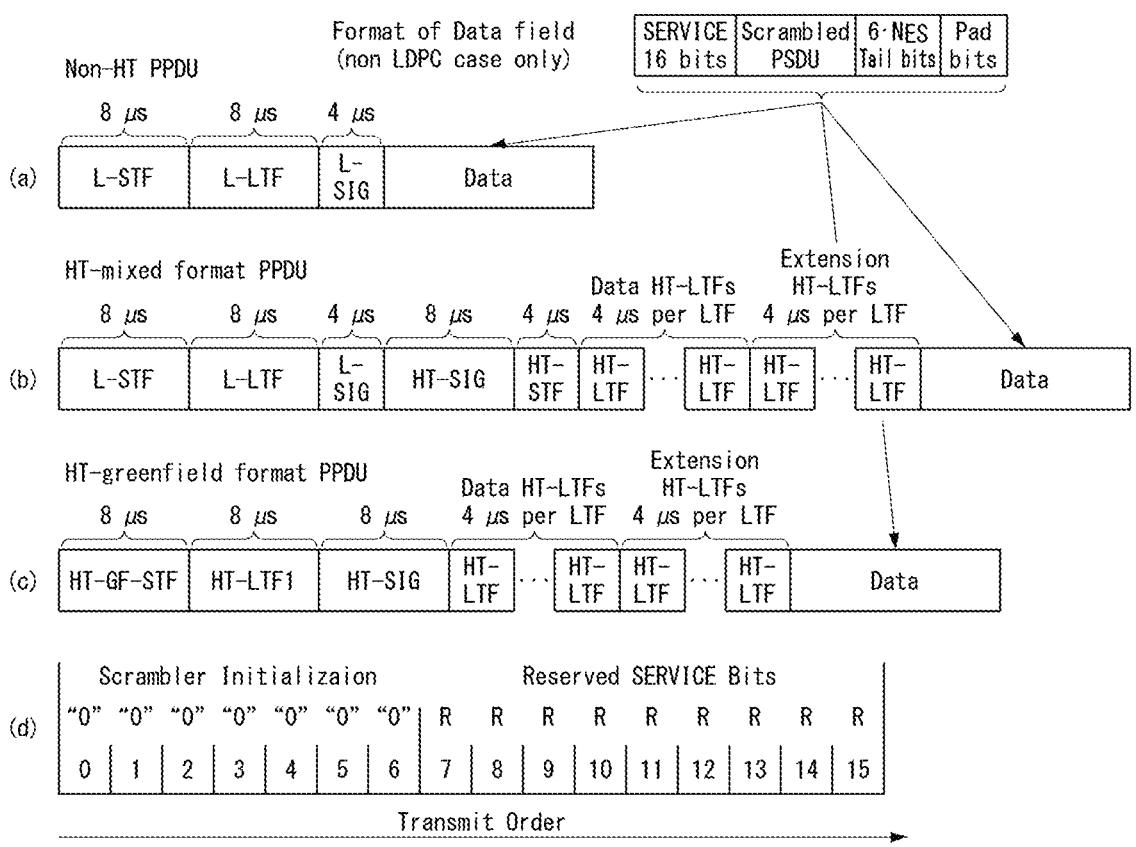

【Figure 4】
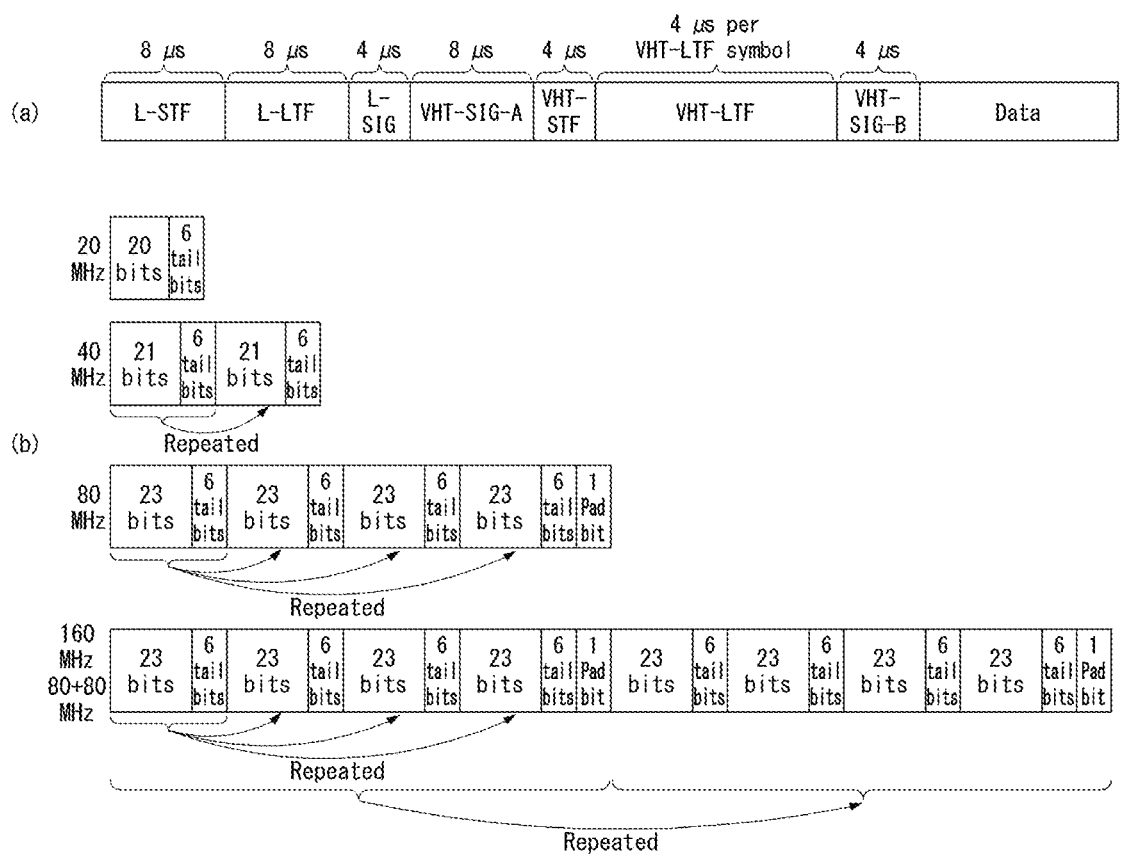

【Figure 5】
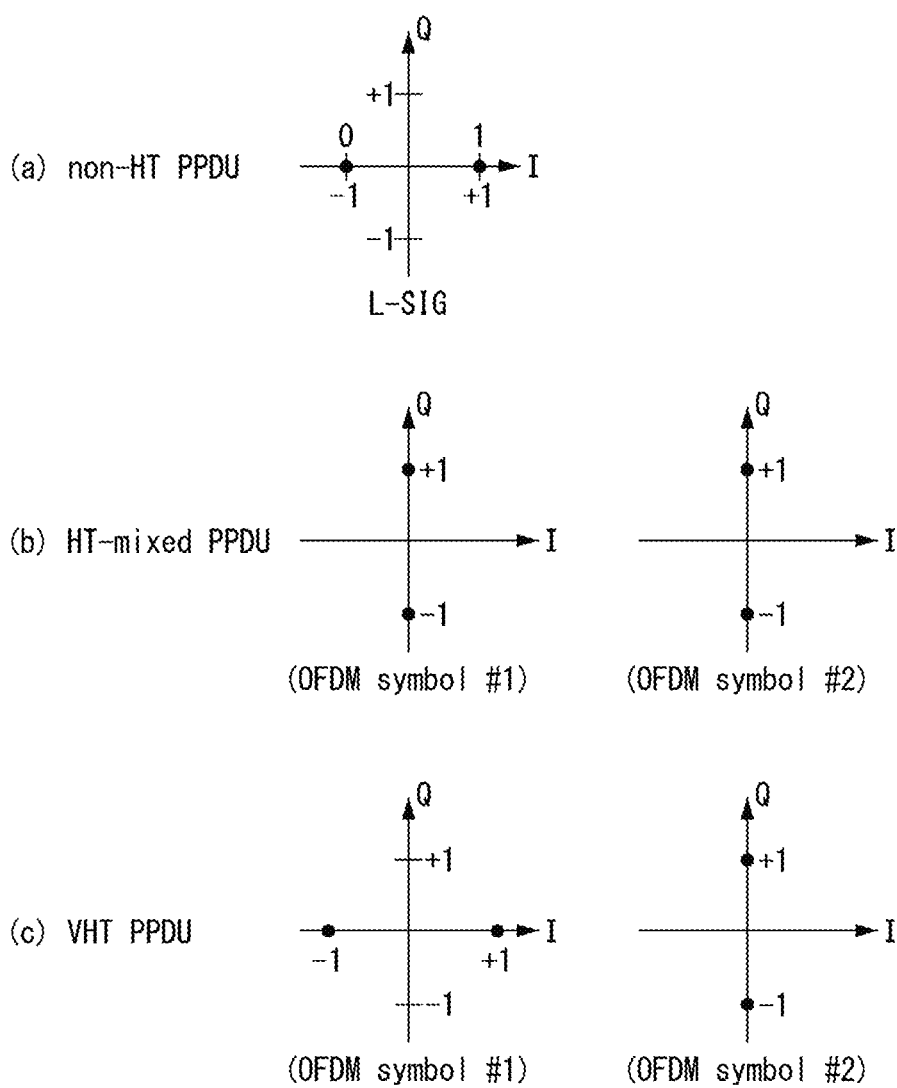

【Figure 6】
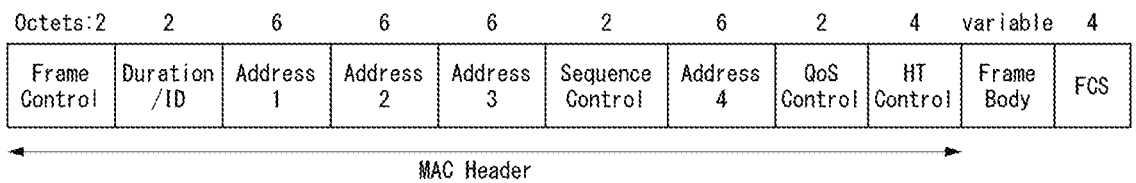
【Figure 7】
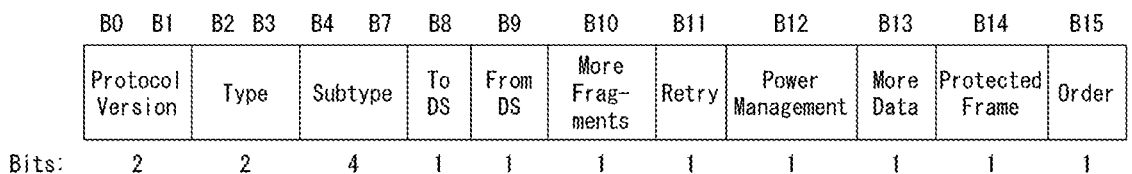
【Figure 8】
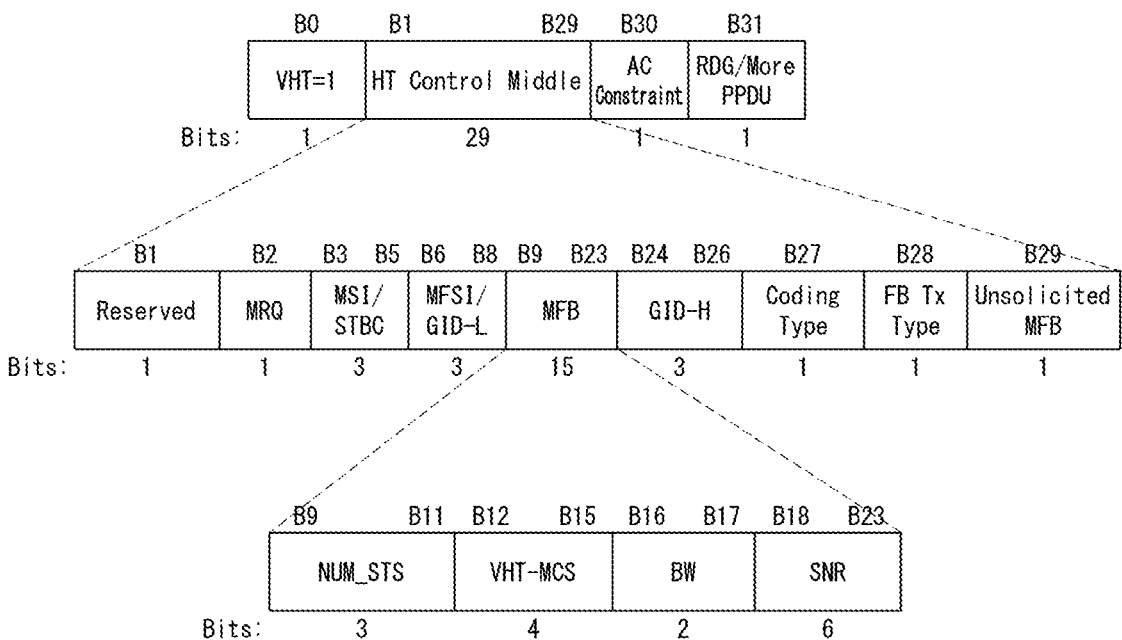

【Figure 9】
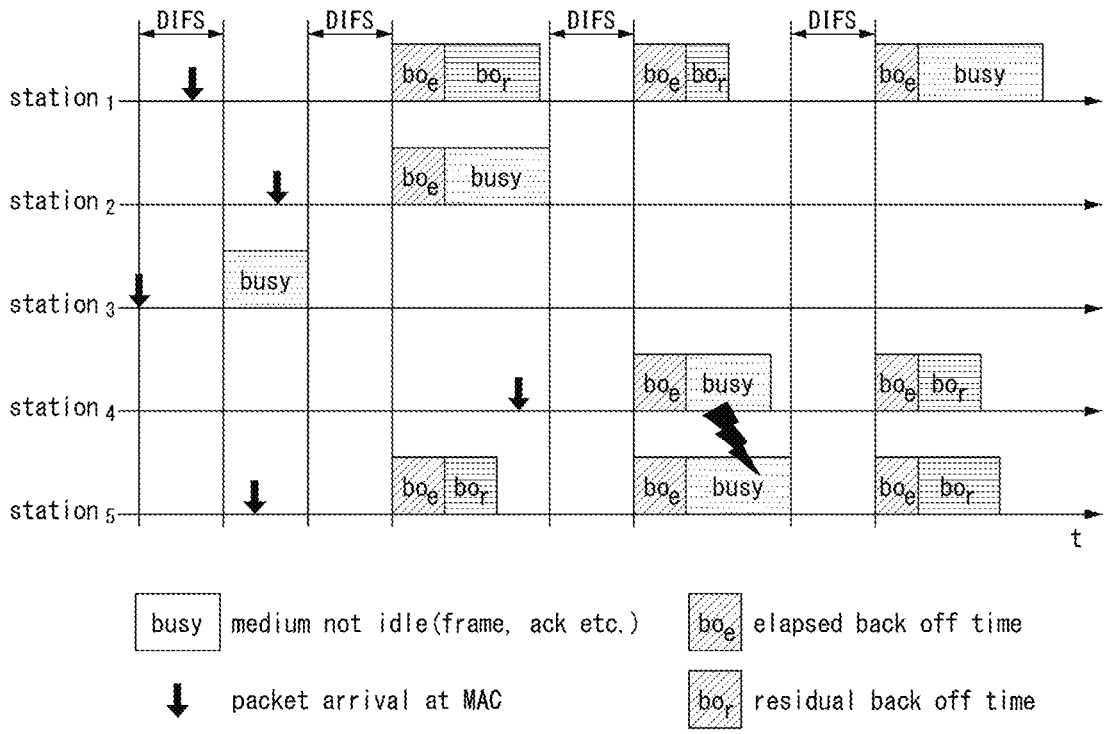
【Figure 10】
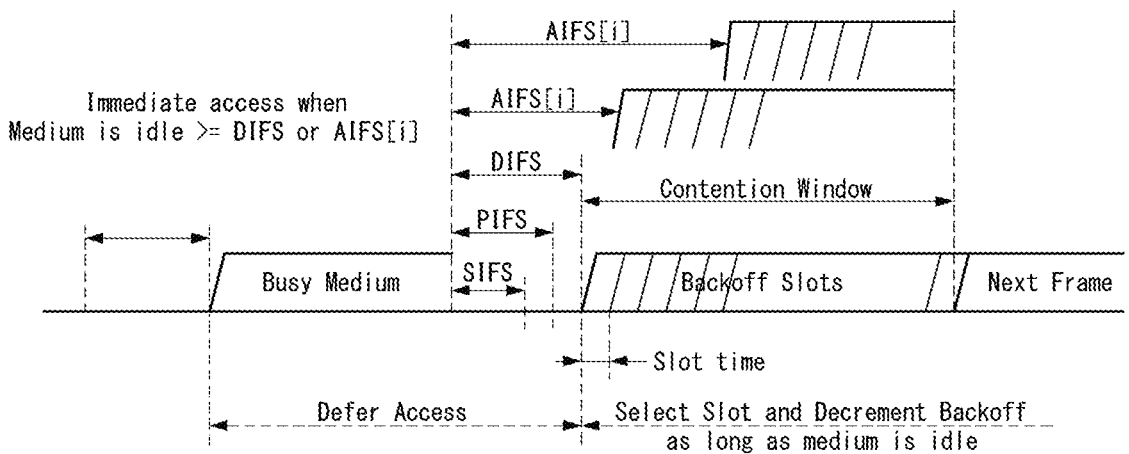

【Figure 11】
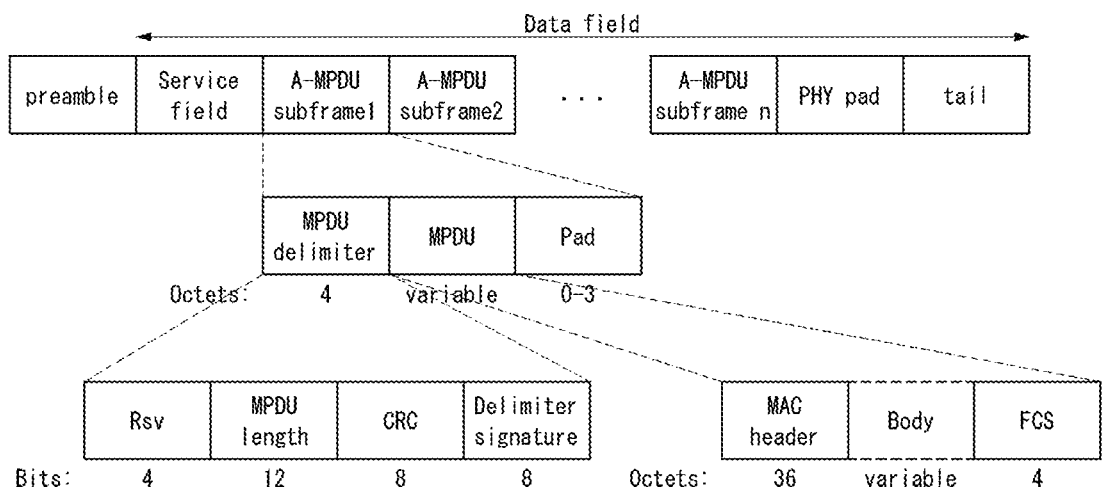
【Figure 12】
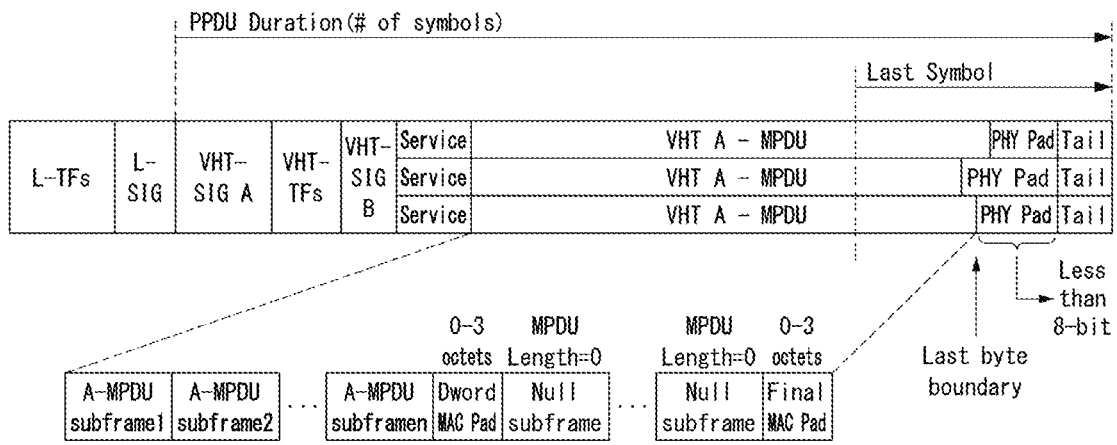

【Figure 13】
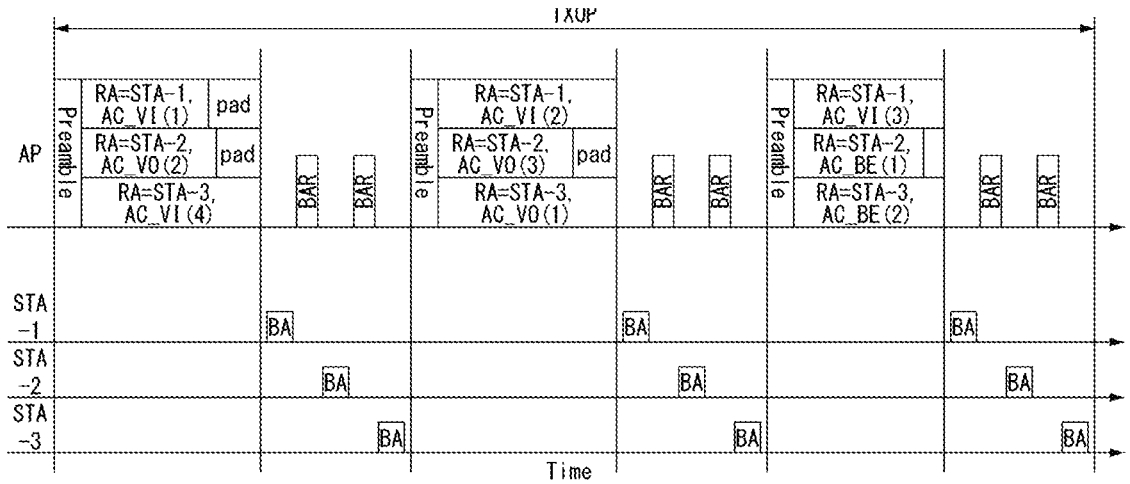
【Figure 14】
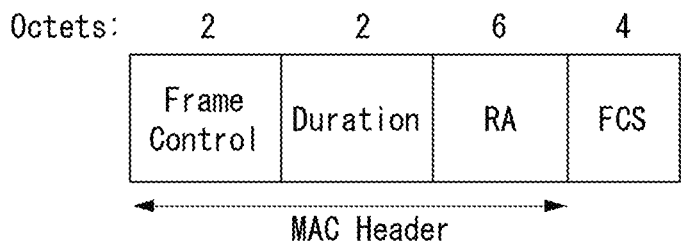
【Figure 15】
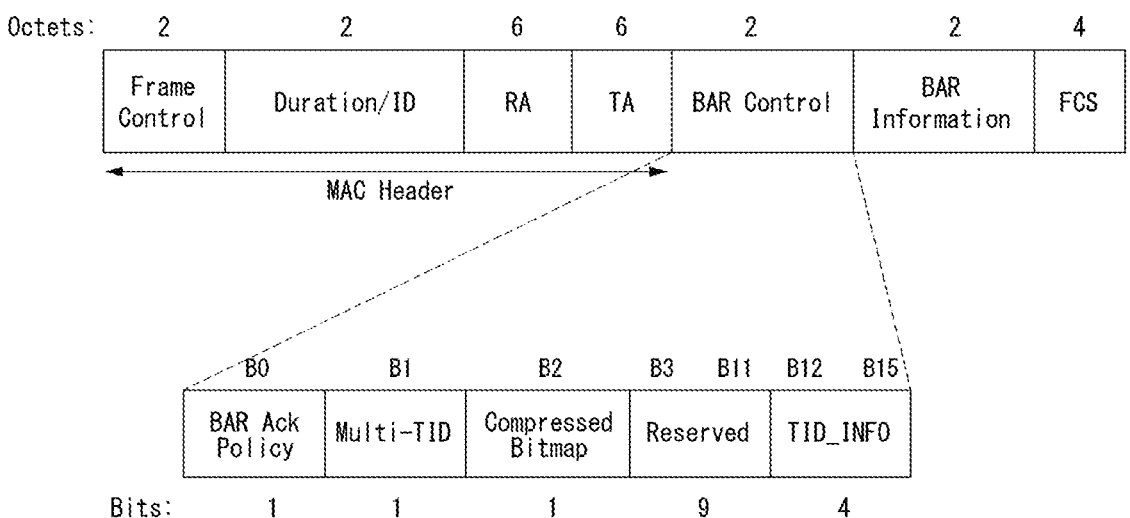

【Figure 16】
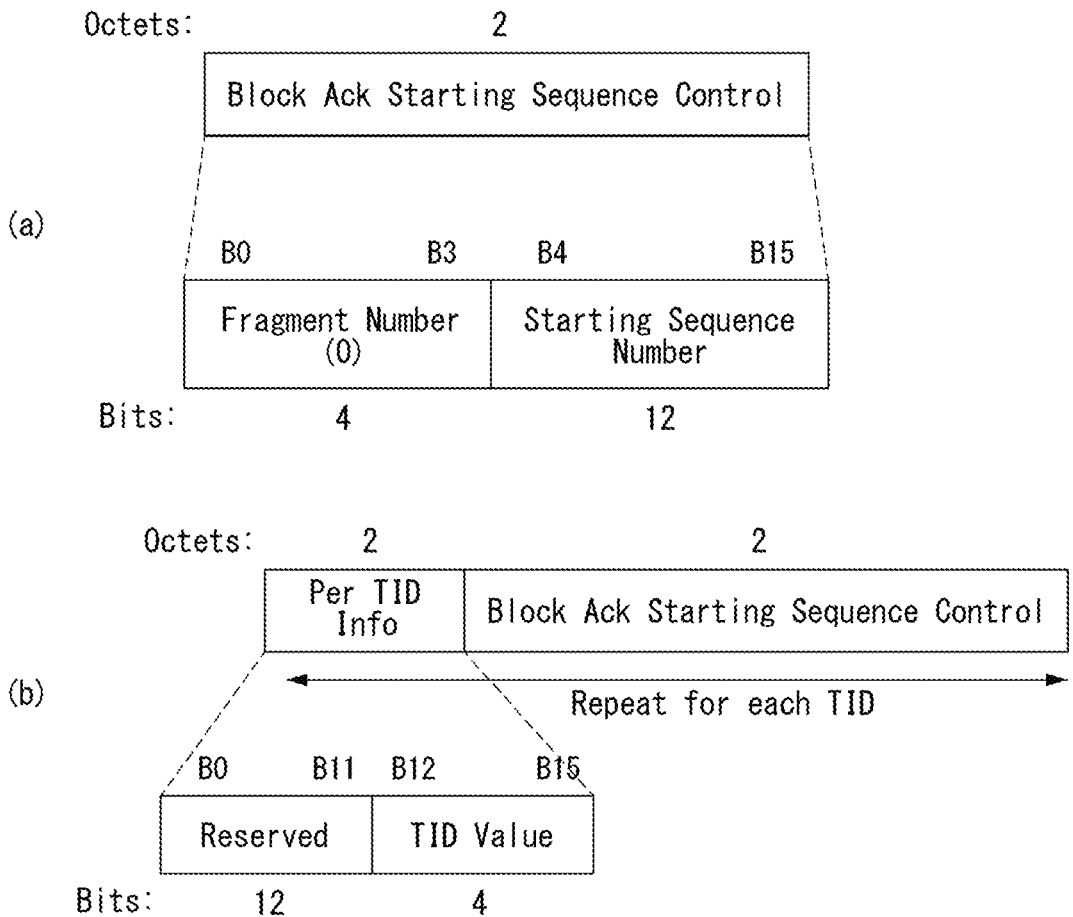
【Figure 17】
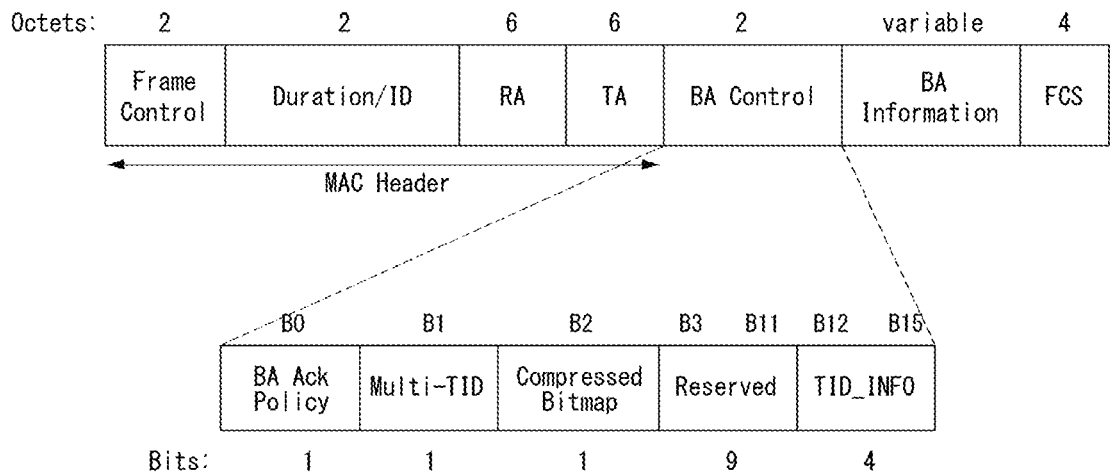

【Figure 18】
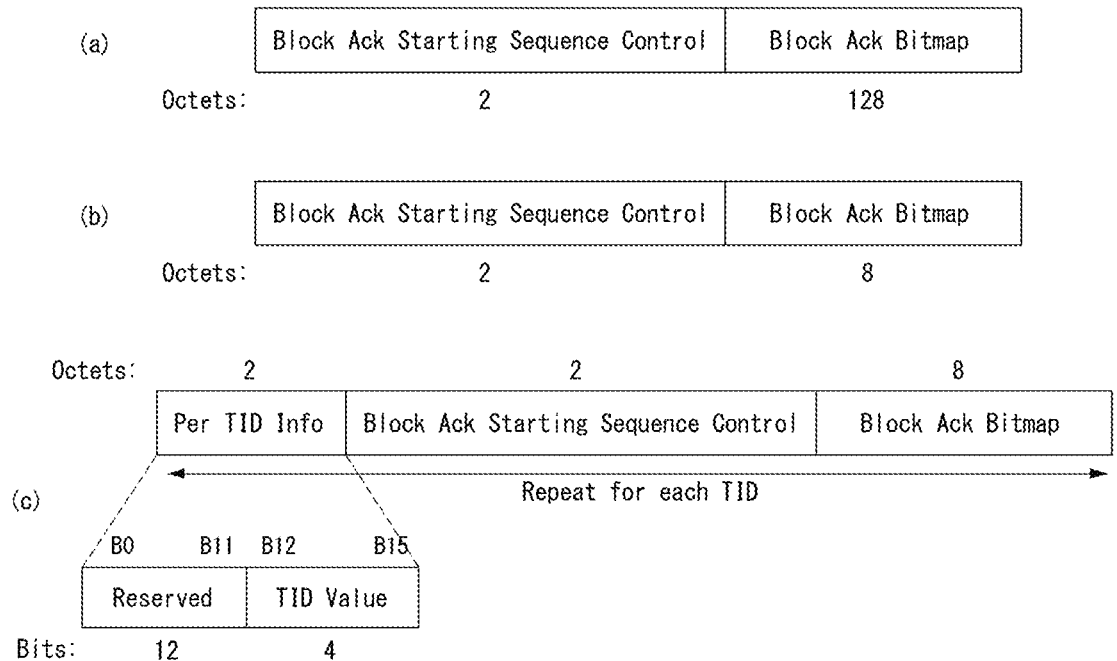
【Figure 19】
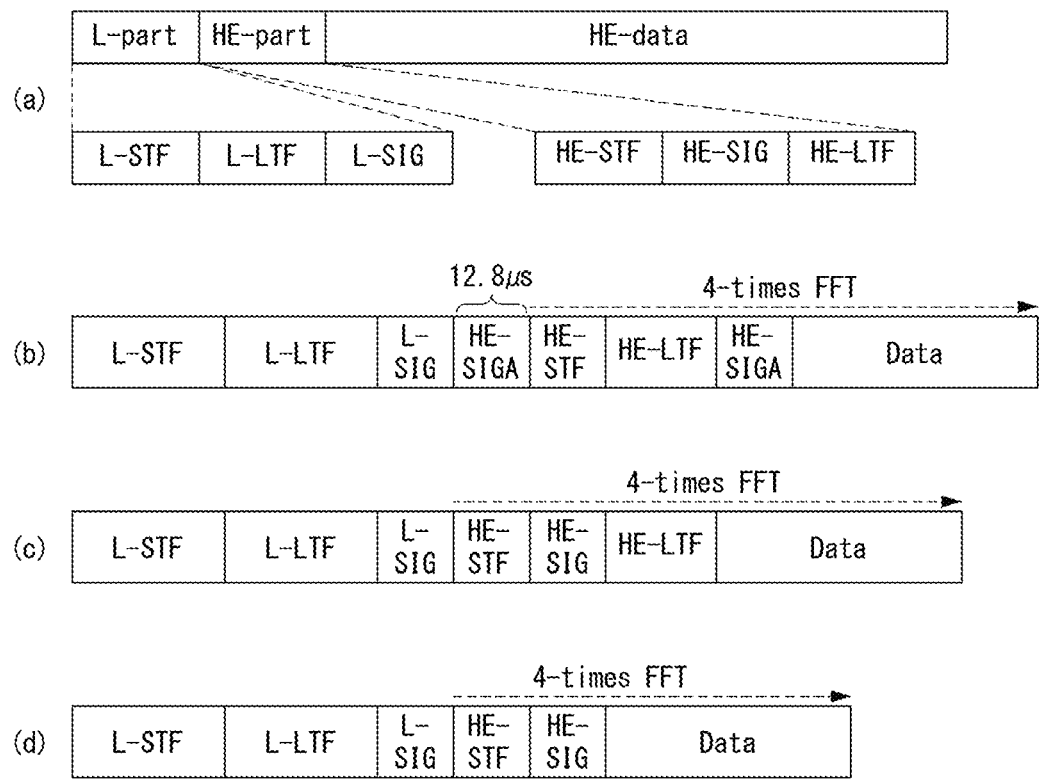

【Figure 20】

| L-STF | L-LTF | L-SIG | HE-SIG A | HE-SIG B | HE-STF | HE-LTF | Data |
|-------|-------|-------|----------|----------|--------|--------|------|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

【Figure 21】

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

【Figure 22】

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

【Figure 23】
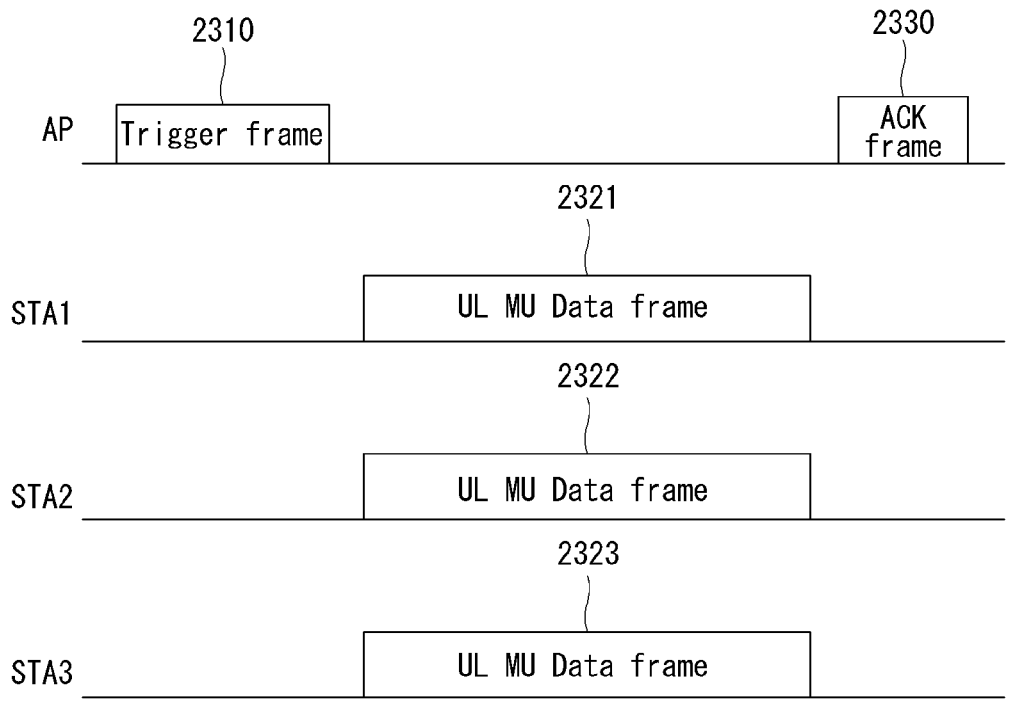
【Figure 24】
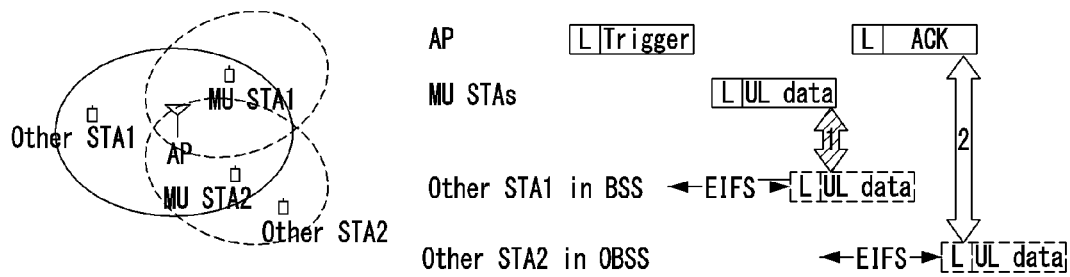
【Figure 25】
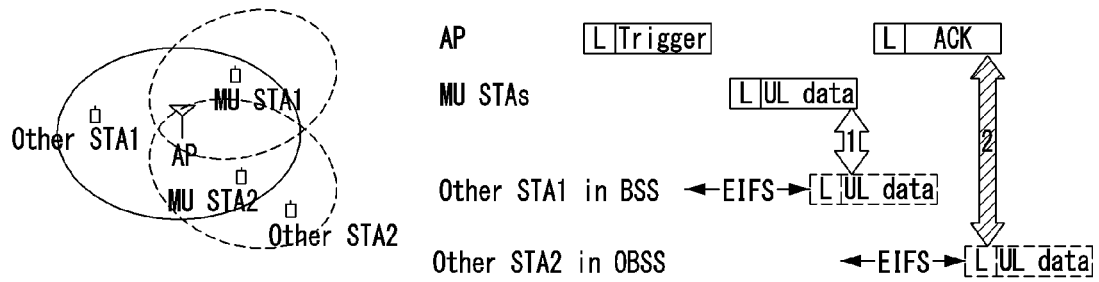

[Figure 26]
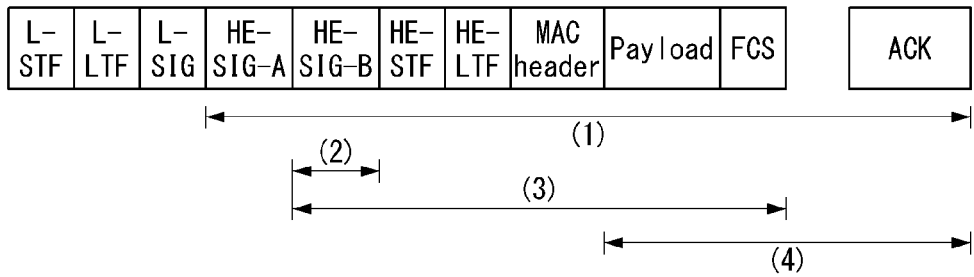
[Figure 27]
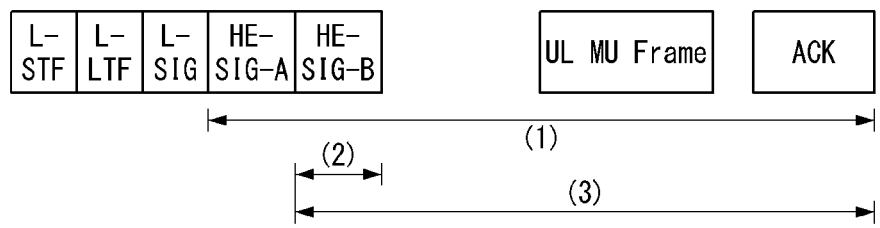
[Figure 28]
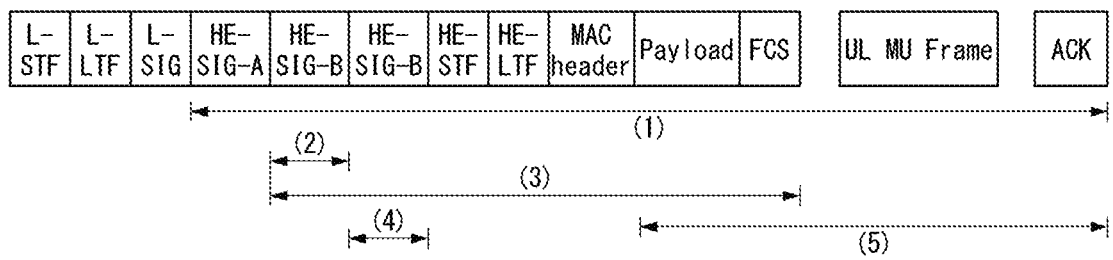
[Figure 29]
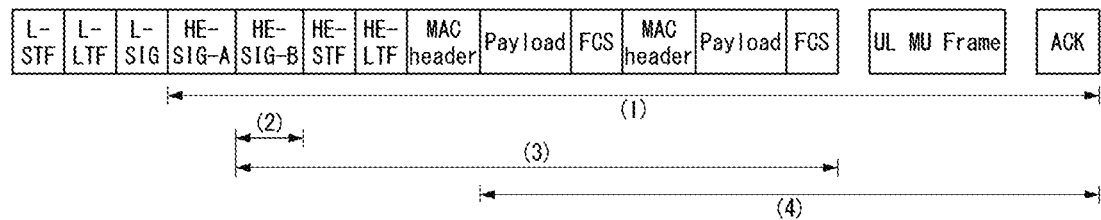

【Figure 30】
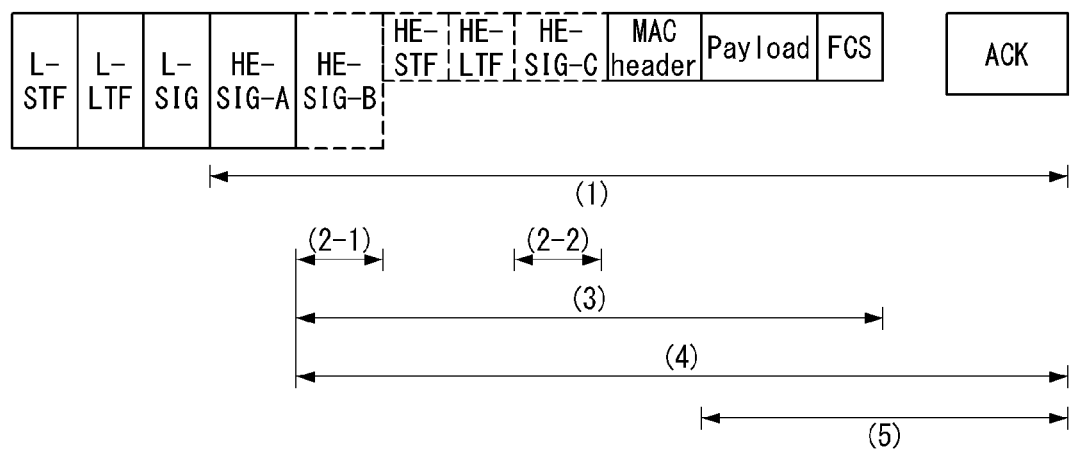
【Figure 31】
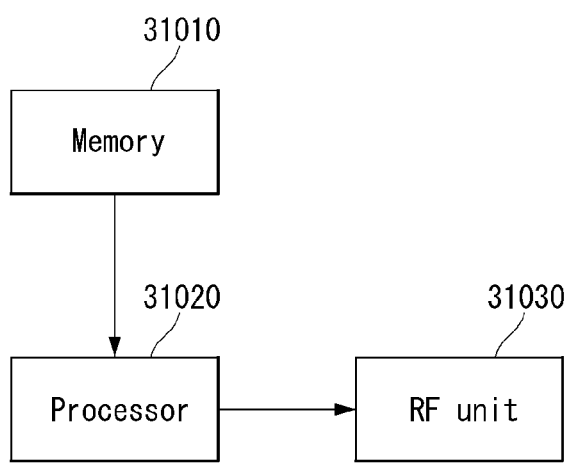

[Figure 32]
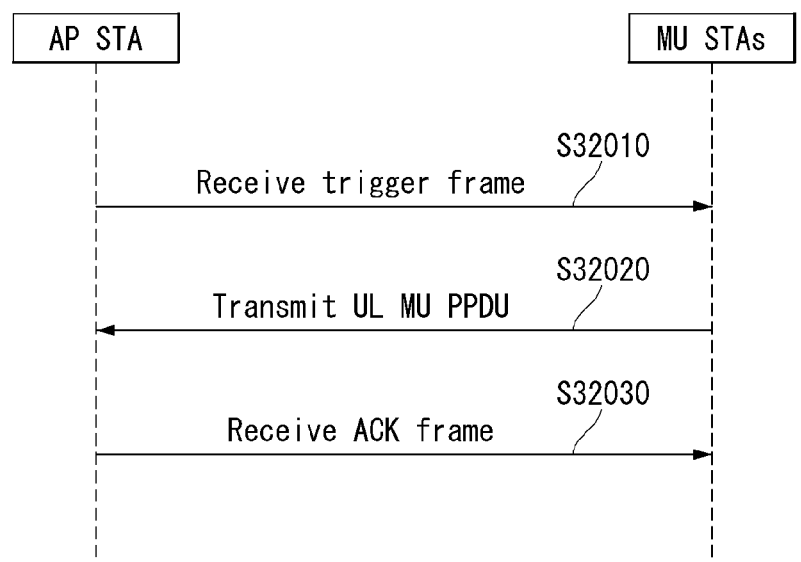

DATA TRANSMISSION METHOD IN WIRELESS COMMUNICATION SYSTEM AND DEVICE THEREFOR

CROSS-REFERENCE TO RELATED APPLICATIONS

This application is a continuation of U.S. patent application Ser. No. 15/527,692, filed on May 17, 2017, now U.S. Pat. No. 10,405,338, which is the National Stage filing under 35 U.S.C. 371 of International Application No. PCT/KR2015/012917, filed on Nov. 30, 2015, which claims the benefit of U.S. Provisional Application No. 62/087,809, filed on Dec. 5, 2014, 62/089,243, filed on Dec. 9, 2014 and 62/109,622, filed on Jan. 30, 2015, the contents of which are all hereby incorporated by reference herein in their entirety.

TECHNICAL FIELD

The present invention relates to a wireless communication system, and more particularly, to a method for performing or supporting uplink single user/multi-user transmission and an apparatus that supports the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An embodiment of the present invention provides an uplink single user or multi-user transmitting method in a wireless communication system.

An embodiment of the present invention further provides an uplink frame structure for supporting uplink single user or multi-user transmission in a wireless communication system.

Technical objects to be achieved by the present invention are not limited to the aforementioned object, and those skilled in the art to which the present invention pertains may evidently understand other technical objects from the following description.

Technical Solution

In an aspect of the present invention, an uplink (UL) multi-user (MU) transmitting method of a station (STA) in a wireless LAN (WLAN) system includes: receiving a trigger frame including resource unit allocation information for orthogonal frequency division multiple access (OFDMA) transmission; transmitting a UL MU Physical Protocol Data Unit (PPDU) based on the trigger frame; and receiving an ACK frame of the UL MU PPDU, wherein the trigger frame includes a first legacy preamble and a first High Efficiency (HE) preamble, and the first HE preamble includes a first HE-SIG-A field and a first HE-SIG-B field, and the first HE-SIG-A field includes first Transmission Opportunity (TXOP) duration information representing a first TXOP duration, and the first TXOP duration is the remaining time interval of a frame exchange sequence of the STA.

The first TXOP duration may include a length in time of the UL MU PPDU and a length in time of the ACK frame.

The UL MU PPDU may include a second legacy preamble and a second HE preamble, and the second HE preamble may include a second HE-SIG-A field, the second HE-SIG-A field may include second TXOP duration information representing a second TXOP duration, and the second TXOP duration may be the remaining time interval of a frame exchange sequence of the STA.

The second TXOP duration may include a length in time of the ACK frame.

The first TXOP duration may further include an Inter Frame Space (IFS) time between the trigger frame and the UL MU frame and an IFS time between the UL MU frame and the ACK frame.

The second TXOP duration may further include an IFS time between the UL MU PPDU and the ACK frame.

The second HE preamble of the UL MU PPDU may include a High Efficiency-Short Training Field (HE-STF), a HE-Long Training Field (HE-LTF), and a data field, and the HE-STF, the HE-LTF, and the data field may be transmitted through a bandwidth of an allocated resource unit.

In another aspect of the present invention, a station (STA) apparatus of a wireless LAN (WLAN) system includes: a Radio Frequency (RF) unit that transmits and receives a wireless signal; and a processor that controls the RF unit, wherein the STA apparatus receives a trigger frame including resource unit allocation information for orthogonal frequency division multiple access (OFDMA) transmission, transmits a UL MU Physical Protocol Data Unit (PPDU) based on the trigger frame, and receives an ACK frame of the UL MU PPDU, the trigger frame includes a first legacy preamble and a first High Efficiency (HE) preamble, and the first HE preamble includes a first HE-SIG-A field and a first HE-SIG-B field, and the first HE-SIG-A field includes first Transmission Opportunity (TXOP) duration information representing a first TXOP duration, and the first TXOP duration is the remaining time interval of a frame exchange sequence of the STA apparatus.

In another aspect of the present invention, an uplink (UL) multi-user (MU) receiving method of an Access Point (AP)-Station (STA) in a wireless LAN (WLAN) system includes: transmitting a trigger frame including resource unit allocation information for orthogonal frequency division multiple access (OFDMA) transmission; receiving a UL MU Physical Protocol Data Unit (PPDU) based on the trigger frame; and transmitting an ACK frame of the UL MU PPDU, wherein the trigger frame includes a first legacy preamble and a first High Efficiency (HE) preamble, and the first HE preamble includes a first HE-SIG-A field and a first HE-SIG-B field, and the first HE-SIG-A field includes first Transmission Opportunity (TXOP) duration information representing a first TXOP duration, and the first TXOP duration is the remaining time interval of a frame exchange sequence of the STA.

Advantageous Effects

According to an embodiment of the present invention, in a wireless communication system, a plurality of users can smoothly perform multi-user transmission through an independent resource.

Further, according to an embodiment of the present invention, a wireless communication system can support transmission of an uplink multi-user in a unit of a resource unit.

According to an embodiment of the present invention, TXOP protection of an UL MU procedure can be effectively performed. In other words, according to an embodiment of the present invention, by including a TXOP duration field in a HE-SIG-A field, an STA, having received only a trigger frame within a BSS and the STA that overhears only the trigger frame in an OBSS can set a NAV. According to an embodiment of the present invention, by including a TXOP duration field in a trigger frame and an UL MU frame, STAs that recognize only one of the trigger frame and the UL MU frame can set a NAV through a TXOP duration field of the UL MU frame.

By including a TXOP duration field in a HE-SIG-A field, while deviating from a capacity limitation of an L-SIG field, an erroneous operation of legacy STAs can be prevented. Further, even when other STAs do not decode a MAC header of frames transmitted and received in an UL MU procedure, by decoding fields up to the HE-SIG-A field, the other STAs can set a NAV.

Advantages which may be obtained in the present invention are not limited to the aforementioned advantages, and various other advantages may be evidently understood by those skilled in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 1 is a diagram showing an example of an IEEE 802.11 system to which an embodiment of the present invention may be applied.

FIG. 2 is a diagram illustrating the structure of layer architecture in an IEEE 802.11 system to which an embodiment of the present invention may be applied.

FIG. 3 illustrates a non-HT format PPDU and HT format PPDU in a wireless communication system to which an embodiment of the present invention may be applied.

FIG. 4 illustrates a VHT format PPDU format in a wireless communication system to which an embodiment of the present invention may be applied.

FIG. 5 is a diagram illustrating a constellation for classifying the formats of PPDUs in a wireless communication system to which an embodiment of the present invention may be applied.

FIG. 6 illustrates the format of an MAC frame of an IEEE 802.11 system to which an embodiment of the present invention may be applied.

FIG. 7 is a diagram illustrating a frame control field within a MAC frame in a wireless communication system to which an embodiment of the present invention may be applied.

FIG. 8 illustrates a VHT format of an HT control field in a wireless communication system to which an embodiment of the present invention may be applied.

FIG. 9 is a diagram for illustrating a random backoff period and a frame transmission procedure in a wireless communication system to which an embodiment of the present invention may be applied.

FIG. 10 is a diagram illustrating an IFS relation in a wireless communication system to which an embodiment of the present invention may be applied.

FIG. 11 is a diagram illustrating a DL MU PPDU format in a wireless communication system to which an embodiment of the present invention may be applied.

FIG. 12 is a diagram illustrating a DL MU PPDU format in a wireless communication system to which an embodiment of the present invention may be applied.

FIG. 13 is a diagram illustrating a DL MU-MIMO transmission process in a wireless communication system to which an embodiment of the present invention may be applied.

FIG. 14 is a diagram illustrating an ACK frame in a wireless communication system to which an embodiment of the present invention may be applied.

FIG. 15 is a diagram illustrating a block ACK request frame in a wireless communication system to which an embodiment of the present invention may be applied.

FIG. 16 is a diagram illustrating the BAR information field of a block ACK request frame in a wireless communication system to which an embodiment of the present invention may be applied.

FIG. 17 is a diagram illustrating a block ACK frame in a wireless communication system to which an embodiment of the present invention may be applied.

FIG. 18 is a diagram illustrating the BA Information field of a block ACK frame in a wireless communication system to which an embodiment of the present invention may be applied.

FIG. 19 is a diagram illustrating a High Efficiency (HE) format PPDU according to an embodiment of the present invention.

FIG. 20 is a diagram illustrating a HE format PPDU according to an embodiment of the present invention.

FIG. 21 is a diagram illustrating a HE format PPDU according to an embodiment of the present invention.

FIG. 22 is a diagram illustrating a HE format PPDU according to an embodiment of the present invention.

FIG. 23 is a diagram illustrating an uplink multi-user transmitting procedure according to an embodiment of the present invention.

FIG. 24 is a diagram illustrating UL MU transmission according to an embodiment of the present invention.

FIG. 25 is a diagram illustrating UL MU transmission according to an embodiment of the present invention.

FIG. 26 is a diagram illustrating a HE frame according to an embodiment of the present invention.

FIG. 27 is a diagram illustrating a UL MU procedure and TXOP protection according to an embodiment of the present invention.

FIG. 28 is a diagram illustrating a UL MU procedure and TXOP protection according to an embodiment of the present invention and particularly illustrates an example of a cascade structure in which a UL MU procedure is transmitted together with a DL MU frame.

FIG. 29 is a diagram illustrating a UL MU procedure and TXOP protection according to an embodiment of the present invention and illustrates an example of a cascade structure in which a UL MU procedure is transmitted together with a DL MU frame.

FIG. 30 is a diagram illustrating a UL MU frame and TXOP protection according to an embodiment of the present invention.

FIG. 31 is a diagram illustrating an STA apparatus according to an embodiment of the present invention.

FIG. 32 is a diagram illustrating a method of transmitting/receiving a UL MU according to an embodiment of the present invention.

MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technological spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

System to which the Present Invention can be Applied

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU includes a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU includes a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio

TABLE 1

| FIELD | BIT | DESCRIPTION |
| --- | --- | --- |
| MCS | 7 | Indicate a modulation and coding scheme |
| CBW 20/40 | 1 | Set to "0" if a CBW is 20 MHz or 40 MHz or upper/lower |
| | | Set to "1" if a CBW is 40 MHz |
| HT length | 16 | Indicate the number of data octets within a PSDU |
| Smoothing | 1 | Set to "1" if channel smoothing is recommended |
| | | Set to "0" if channel estimation is recommended unsmoothingly for each carrier |
| Not-sounding | 1 | Set to "0" if a PPDU is a sounding PPDU |
| | | Set to "1" if a PPDU is not a sounding PPDU |
| Reserved | 1 | Set to "1" |
| Aggregation | 1 | Set to "1" if a PPDU includes an A-MPDU |
| | | Set to "0" if not |
| Space-time block coding (STBC) | 2 | Indicate a difference between the number of space-time streams (NSTS) and the number of spatial streams (NSS) indicated by an MCS |
| | | Set to "00" if an STBC is not used |
| FEC coding | 1 | Set to "1" if low-density parity check (LDPC) is used |
| | | Set to "0" if binary convolutional code (BCC) is used |
| Short GI | 1 | Set to "1" if a short guard interval (GI) is used after HT training |
| | | Set to "0" if not |
| Number of extension spatial streams | 2 | Indicate the number of extension spatial streams (NESSs) |
| | | Set to "0" if there is no NESS |
| | | Set to "1" if the number of NESSs is 1 |
| | | Set to "2" if the number of NESSs is 2 |
| | | Set to "3" if the number of NESSs is 3 |
| CRC | 8 | Include CRS for detecting an error of a PPDU on the receiver side |
| Tail bits | 6 | Used to terminate the trellis of a convolutional decoder |
| | | Set to "0" | channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU includes a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmitting STA group in order to support MU-MIMO transmission, and may indicate whether the present MIMO transmission method is MU-MIMO or SU-MIMO.

Table 2 illustrates the VHT-SIG-A1 field.

TABLE 2

| FIELD | BIT | DESCRIPTION |
| --- | --- | --- |
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions<br>"p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows: |

TABLE 2-continued

| FIELD | BIT | DESCRIPTION |
|---|---|---|
| | | "0" if a space-time stream is 1 |
| | | "1" if a space-time stream is 2 |
| | | "2" if a space-time stream is 3 |
| | | "3" if a space-time stream is 4 |
| | | "4" if a space-time stream is 5 |
| | | "5" if a space-time stream is 6 |
| | | "6" if a space-time stream is 7 |
| | | "7" if a space-time stream is 8 |
| | | Lower 9 bits indicate a partial AID. |
| TXOP_PS_NOT_ALLOWED | 1 | Set to "0" if a VHT AP permits a non-AP VHT STA to switch to power save mode during transmission opportunity (TXOP) Set to "1" if not In the case of a VHT PPDU transmitted by a non-AP VHT STA Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| FIELD | BIT | DESCRIPTION |
|---|---|---|
| Short GI | 1 | Set to "0" if a short GI is not used in a data field Set to "1" if a short GI is used in a data field |
| Short GI disambiguation | 1 | Set to "1" if a short GI is used and an extra symbol is required for the payload of a PPDU Set to "0" if an extra symbol is not required |
| SU/MU coding | 1 | In the case of a VHT SU PPDU: Set to "0" in the case of binary convolutional code (BCC) Set to "1" in the case of low-density parity check (LDPC) In the case of a VHT MU PPDU: Indicate coding used if the NSTS field of a user whose user position is "0" is not "0" Set to "0" in the case of BCC Set to "1" in the case of PDPC Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU) Set to "0" if not |
| SU VHT MCS/MU coding | 4 | In the case of a VHT SU PPDU: Indicate a VHT-MCS index In the case of a VHT MU PPDU: Indicate coding for user positions "1" to "3" sequentially from upper bits Indicate coding used if the NSTS field of each user is not "1" Set to "0" in the case of BCC Set to "1" in the case of LDPC Set to "1" as a reserved field if the NSTS field of each user is "0" |
| Beamformed | 1 | In the case of a VHT SU PPDU: Set to "1" if a beamforming steering matrix is applied to SU transmission Set to "0" if not In the case of a VHT MU PPDU: Set to "1" as a reserved field |
| Reserved | 1 | |
| CRC | 8 | Include CRS for detecting an error of a PPDU on the receiver side |
| Tail | 6 | Used to terminate the trellis of a convolutional decoder Set to "0" |

The VHT-STF is used to improve AGC estimation performance in MIMO transmission.

The VHT-LTF is used for a VHT-STA to estimate an MIMO channel Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail below with reference to the following drawings.

FIG. 5 is a diagram illustrating constellations for classifying the formats of PPDUs in a wireless communication system to which an embodiment of the present invention may be applied.

FIG. 5(a) illustrates the constellation of an L-SIG field included in a non-HT format PPDU, FIG. 5(b) illustrates a phase rotation for HT mixed format PPDU detection, and FIG. 5(c) illustrates a phase rotation for VHT format PPDU detection.

In order to classify a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(a), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(a). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(b), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts decoding for a first OFDM symbol and second OFDM symbol corresponding to an HT-SIG-A field transmitted after the L-SIG field of the received PPDU based on a constellation, such as the example of FIG. 5(b). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(c), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees. That is, BPSK is used as a modulation method for the OFDM symbol #1, and QBPSK is used as a modulation method for the OFDM symbol #2.

An STA attempts decoding for the first OFDM symbol and second OFDM symbol corresponding to the VHT-SIG field transmitted after the L-SIG field of the received PPDU based on a constellation, such as the example of FIG. 5(c). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 illustrates the format of an MAC frame for an IEEE 802.11 system to which an embodiment of the present invention may be applied.

Referring to FIG. 6, the MAC frame (i.e., an MPDU) includes an MAC header, a frame body, and a frame check sequence (FCS).

The MAC Header is defined as an area, including a Frame Control field, a Duration/ID field, an Address 1 field, an Address 2 field, an Address 3 field, a Sequence Control field, an Address 4 field, a QoS Control field, and an HT Control field.

The Frame Control field includes information about the characteristics of a corresponding MAC frame. The Frame Control field is described in detail later.

The Duration/ID field may be implemented to have a different value depending on the type and subtype of a corresponding MAC frame.

If the type and subtype of a corresponding MAC frame is a PS-poll frame for a power save (PS) operation, the Duration/ID field may be configured to include the association identifier (AID) of an STA that has transmitted the frame. In the remaining cases, the Duration/ID field may be configured to have a specific duration value depending on the type and subtype of a corresponding MAC frame. Furthermore, if a frame is an MPDU included in an aggregate-MPDU (A-MPDU) format, the Duration/ID field included in an MAC header may be configured to have the same value.

The Address 1 field to the Address 4 field are used to indicate a BSSID, a source address (SA), a destination address (DA), a transmitting address (TA) indicating the address of a transmitting STA, and a receiving address (RA) indicating the address of a receiving STA.

An Address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The Sequence Control field includes a sequence number and a fragment number. The sequence number may indicate a sequence number assigned to a corresponding MAC frame. The fragment number may indicate the number of each fragment of a corresponding MAC frame.

The QoS Control field includes information related to QoS. The QoS Control field may be included if it indicates a QoS Data frame in a subtype subfield.

The HT Control field includes control information related to an HT and/or VHT transmission/reception scheme. The HT Control field is included in a control wrapper frame. Furthermore, the HT Control field is present in a QoS Data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the Frame Control field, the Duration/ID field, and Address 1 field) and the Last field (i.e., the FCS field) form a minimum frame format and are present in all of frames. The remaining fields may be present only in a specific frame type.

FIG. 7 is a diagram illustrating a Frame Control field within the MAC frame in a wireless communication system to which an embodiment of the present invention may be applied.

Referring to FIG. 7, the Frame Control field includes a Protocol Version subfield, a Type subfield, a Subtype subfield, a To DS subfield, a From DS subfield, a More Fragments subfield, a Retry subfield, a Power Management subfield, a More Data subfield, a Protected Frame subfield, and an Order subfield.

The Protocol Version subfield may indicate the version of a WLAN protocol applied to a corresponding MAC frame.

The Type subfield and the Subtype subfield may be set to indicate information that identifies the function of a corresponding MAC frame.

The type of MAC frame may include the three types of management frames, control frames, and data frames.

Furthermore, each of the frame types may be divided into subtypes.

For example, the control frames may include request to send (RTS) frame, a clear-to-send (CTS) frame, an acknowledgment (ACK) frame, a PS-poll frame, a contention free (CF)-end frame, a CF-End+CF-ACK frame, a block ACK request (BAR) frame, a block ACK (BA) frame, a control wrapper (Control+HTcontrol)) frame, a VHT null data packet announcement (NDPA), and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information that is necessary to analyze an Address 1 field to an Address 4 field included in a corresponding MAC frame header. In the case of the control frame, both the To DS subfield and the From DS subfield are set to "0." In the case of the management frame, the To DS subfield and the From DS subfield may be sequentially set to "1" and "0" if a corresponding frame is a QoS management frame (QMF) and may be sequentially set to "0" and "0" if a corresponding frame is not a QMF.

The More Fragments subfield may indicate whether a fragment to be transmitted after a corresponding MAC frame is present or not. The More Fragments subfield may be set to "1" if another fragment of a current MSDU or MMPDU is present and may be set to "0" if another fragment of a current MSDU or MMPDU is not present.

The Retry subfield may indicate whether the transmission of a corresponding MAC frame is based on the retransmission of a previous MAC frame. The Retry subfield may be set to "1" if the transmission of a corresponding MAC frame is based on the retransmission of a previous MAC frame and may be set to "0" if the transmission of a corresponding MAC frame is not based on the retransmission of a previous MAC frame.

The Power Management subfield may indicate power management mode of an STA. The Power Management subfield may indicate that an STA switches to power saving mode if the Power Management subfield value is "1."

The More Data subfield may indicate whether an MAC frame to be additionally transmitted is present or not. The More Data subfield may be set to "1" if an MAC frame to be additionally transmitted is present and may be set to "0" if an MAC frame to be additionally transmitted is not present.

The Protected Frame subfield may indicate whether a Frame Body field has been encrypted. The Protected Frame subfield may be set to "1" if the Frame Body field includes information processed by a cryptographic encapsulation algorithm and may be set to "0" if the Frame Body field does not include information processed by a cryptographic encapsulation algorithm.

The pieces of information included in each of the aforementioned fields may comply with the definition of the IEEE 802.11 system. Furthermore, the aforementioned fields correspond to an example of fields which may be included in an MAC frame, but the present invention is not limited thereto. That is, each of the aforementioned fields may be replaced with another field or an additional field may be further included and all of the fields may not be essentially included.

FIG. 8 illustrates a VHT format of an HT Control field in a wireless communication system to which an embodiment of the present invention may be applied.

Referring to FIG. 8, the HT Control field may include a VHT subfield, an HT control middle subfield, an AC constraint subfield, and a reverse direction grant (RDG)/more PPDU subfield.

The VHT subfield indicates whether the HT Control field has the format of an HT Control field for VHT (VHT=1) or has the format of an HT Control field for HT (VHT=0). In FIG. 8, it is assumed that the HT Control field is an HT Control field for VHT (i.e., VHT=1). The HT Control field for VHT may be called a VHT Control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted.

As described above, the HT control middle subfield may be implemented to a different format depending on the indication of a VHT subfield.

The HT control middle subfield of an HT Control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

TABLE 4

| SUBFIELD | MEANING | DEFINITION |
| --- | --- | --- |
| MRQ | MCS request | Set to "1" if MCS feedback (solicited MFB) is not requested Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1." Include a compressed MSI subfield (2 bits) and an STBC indication subfield (1 bit) if an unsolicited MFB subfield is "1." |
| MFSI/GID-L | MFB sequence identifier/LSB of group ID | An MFSI/GID-L subfield includes the received value of an MSI included within a frame related to MFB information if an unsolicited MFB subfield is set to "0." An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB. VHT-MCS = 15, NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU. All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |

TABLE 4-continued

| SUBFIELD | MEANING | DEFINITION |
| --- | --- | --- |
| FB Tx Type | Transmission type of MFB response | An FB Tx Type subfield is set to "0" if an unsolicited MFB subfield is set to "1" and MFB has been estimated from an unbeamformed VHT PPDU. An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 7 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the Duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.
  a) A reduced interframe space (IFS) (RIFS)
  b) A short interframe space (IFS) (SIFS)
  c) A PCF interframe space (IFS) (PIFS)
  d) A DCF interframe space (IFS) (DIFS)
  e) An arbitration interframe space (IFS) (AIFS)
  f) An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a Block ACK Request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium. The PIFS may be used in the following cases.

An STA operating under a PCF
An STA sending a channel switch announcement frame
An STA sending a traffic indication map (TIM) frame
A hybrid coordinator (HC) starting a CFP or transmission opportunity (TXOP)
An HC or non-AP QoS STA, that is, a TXOP holder polled for recovering from the absence of expected reception within a controlled access phase (CAP)
An HT STA using dual CTS protection before sending CTS2
A TXOP holder for continuous transmission after a transmission failure
A reverse direction (RD) initiator for continuous transmission using error recovery
An HT AP during a PSMP sequence in which a power save multi-poll (PSMP) recovery frame is transmitted
An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

The "aSIFSTime" is defined as in Equations 1 and 2 below.

$$\text{aSIFSTime (16 μs)=aRxRFDelay (0.5)+aRxPLCPDelay (12.5)+aMACProcessingDelay (1 or <2)+aRxTxTurnaroundTime (<2)} \qquad \text{[Equation 1]}$$

$$\text{aRxTxTurnaroundTime=aTxPLCPDelay(1)+aRxTxSwitchTime(0.25)+aTxRampOnTime(0.25)+aTxRFDelay(0.5)} \qquad \text{[Equation 2]}$$

The "aSlotTime" is defined as in Equation 3 below.

$$\text{aSlotTime=aCCATime(<4)+aRxTxTurnaroundTime (<2)+aAirPropagationTime(<1)+aMACProcessingDelay(<2)} \qquad \text{[Equation 3]}$$

In Equation 3, a default physical layer parameter is based on "aMACProcessingDelay" having a value which is equal to or smaller than 1 μs. A radio wave is spread 300 m/μs in the free space. For example, 3 μs may be the upper limit of a BSS maximum one-way distance~450 m (a round trip is ~900 m).

The PIFS and the SIFS are defined as in Equations 4 and 5, respectively.

$$\text{DIFS (16 μs)=aSIFSTime+aSlotTime} \qquad \text{[Equation 4]}$$

$$\text{DIFS (34 μs)=aSIFSTime+2*aSlotTime} \qquad \text{[Equation 5]}$$

In Equations 1 to 5, the numerical value within the parenthesis illustrates a common value, but the value may be different for each STA or for the position of each STA.

The aforementioned SIFS, PIFS, and DIFS are measured based on an MAC slot boundary (e.g., a Tx SIFS, a Tx PIFS, and a TxDIFS) different from a medium.

The MAC slot boundaries of the SIFS, the PIFS, and the DIFS are defined as in Equations 6 to 8, respectively.

$$\text{TxSIFS=SIFS-aRxTxTurnaroundTime} \qquad \text{[Equation 6]}$$

$$\text{TxPIFS=TxSIFS+aSlotTime} \qquad \text{[Equation 7]}$$

$$\text{TxDIFS=TxSIFS+2*aSlotTIme} \qquad \text{[Equation 8]}$$

Downlink (DL) MU-MIMO Frame

FIG. 11 is a diagram illustrating a DL multi-user (MU) PPDU format in a wireless communication system to which an embodiment of the present invention may be applied.

Referring to FIG. 11, the PPDU includes a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 12 is a diagram illustrating a DL multi-user (MU) PPDU format in a wireless communication system to which an embodiment of the present invention may be applied.

In FIG. 12, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 12, the MU PPDU includes L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 12, each VHT A-MPDU may be transmitted in a different stream.

In FIG. 12, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block ACK Procedure

FIG. 13 is a diagram illustrating a DL MU-MIMO transmission process in a wireless communication system to which an embodiment of the present invention may be applied.

In 802.11ac, MU-MIMO is defined in downlink from an AP to a client (i.e., a non-AP STA). In this case, a multi-user (MU) frame is transmitted to multiple recipients at the same time, but acknowledgement (ACK) needs to be individually transmitted in uplink.

All of MPDUs transmitted within a VHT MU PPDU based on 802.11ac are included in an A-MPDU. Accordingly, a response to the A-MPDU within the VHT MU PPDU other than an immediate response to the VHT MU PPDU is transmitted in response to a block ACK request (BAR) frame by the AP.

First, an AP sends a VHT MU PPDU (i.e., a preamble and data) to all of recipients (i.e., an STA 1, an STA 2, and an STA 3). The VHT MU PPDU includes a VHT A-MPDU transmitted to each of the STAs.

The STA 1 that has received the VHT MU PPDU from the AP sends a block acknowledgement (BA) frame to the AP after an SIFS. The BA frame is described later in detail.

The AP that has received the BA from the STA 1 sends a block acknowledgement request (BAR) frame to the STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

When such a process is performed by all of the STAs, the AP sends a next MU PPDU to all of the STAs.

Acknowledgement (ACK)/Block ACK Frame

In general, an ACK frame is used as a response to an MPDU, and a block ACK frame is used as a response to an A-MPDU.

FIG. 14 is a diagram illustrating an ACK frame in a wireless communication system to which an embodiment of the present invention may be applied.

Referring to FIG. 14, the ACK frame includes a Frame Control field, a Duration field, an RA field, and an FCS.

The RA field is set as the value of the second address (Address 2) field of a data frame, a management frame, a block ACK request frame, a block ACK frame or a PS-Poll frame that has been received right before.

When an ACK frame is transmitted by a non-QoS STA, if a more fragments subfield within the Frame Control field of a data frame or a management frame that has been received right before is "0", a duration value is set to "0."

In an ACK frame not transmitted by a non-QoS STA, a duration value is set as a value (ms) obtained by subtracting the time required to send the ACK frame and an SIFS interval from the Duration/ID field of a data frame, a management frame, a block ACK request frame, a block ACK frame or a PS-Poll frame that has been received right before. If the calculated duration value is not an integer value, it is rounded off to the nearest whole number.

Hereinafter, a block ACK (request) frame is described.

FIG. 15 is a diagram illustrating a block ACK request frame in a wireless communication system to which an embodiment of the present invention may be applied.

Referring to FIG. 15, the Block ACK Request (BAR) frame includes a Frame Control field, a Duration/ID field, a Receiving Address (RA) field, a Transmitting Address (TA) field, a BAR Control field, a BAR Information field, and a frame check sequence (FCS).

The RA field may be set as the address of an STA that receives the BAR frame.

The TA field may be set as the address of an STA that sends the BAR frame.

The BAR Control field includes a BAR ACK Policy subfield, a Multi-TID subfield, a Compressed Bitmap subfield, a Reserved subfield, and a TID Information (TID_Info) subfield.

Table 5 illustrates the BAR Control field.

TABLE 5

| SUBFIELD | BIT | DESCRIPTION |
| --- | --- | --- |
| BAR ACK policy | 1 | Set to "0" when a sender requests an immediate ACK for data transmission. Set to "1" when a sender does not request an immediate ACK for data transmission. |
| Multi-TID | 1 | Indicate the type of BAR frame depending on the value of a |
| Compressed bitmap | 1 | Multi-TID subfield and a Compressed Bitmap subfield. 00: Basic BAR 01: Compressed BAR 10: Reserved value 11: Multi-TID BAR |
| Reserved | 9 | |
| TID_Info | 4 | The meaning of a TID_Info field is determined by the type of BAR frame. Include TID that requests a BA frame in the case of a Basic BAR frame or a Compressed BAR frame. Include the number of TIDs in the case of a Multi-TID BAR frame |

The BAR Information field includes different information depending on the type of BAR frame. This is described with reference to FIG. 16.

FIG. 16 is a diagram illustrating the BAR Information field of a block ACK request frame in a wireless communication system to which an embodiment of the present invention may be applied.

FIG. 16(a) illustrates the BAR information field of a Basic BAR frame and a Compressed BAR frame, and FIG. 16(b) illustrates a BAR information field of a Multi-TID BAR frame.

Referring to FIG. 16(a), in the case of the Basic BAR frame and the Compressed BAR frame, a BAR Information field includes a Block ACK Starting Sequence Control subfield.

Furthermore, the Block ACK Starting Sequence Control subfield includes a Fragment Number subfield and a Starting Sequence Number subfield.

The Fragment Number field is set to 0.

In the case of the Basic BAR frame, the Starting Sequence Number subfield includes the sequence number of the first MSDU in which a corresponding BAR frame is transmitted. In the case of the Compressed BAR frame, the Starting Sequence Control subfield includes the sequence number of the first MSDU or A-MSDU for transmitting a corresponding BAR frame.

Referring to FIG. 16(b), in the case of the Multi-TID BAR frame, the BAR Information field is configured in such a manner that a Per TID Info subfield and a Block ACK Starting Sequence Control subfield are repeated for one or more TIDs.

The Per TID Info subfield includes a Reserved subfield and a TID Value subfield. The TID Value subfield includes a TID value.

The Block ACK Starting Sequence Control subfield, as described above, includes a fragment number and a Starting Sequence Number subfield. The Fragment Number field is set to 0. The Starting Sequence Control subfield includes the sequence number of the first MSDU or A-MSDU for transmitting a corresponding BAR frame.

FIG. 17 is a diagram illustrating a block ACK frame in a wireless communication system to which an embodiment of the present invention may be applied.

Referring to FIG. 17, the Block ACK (BA) frame includes a Frame Control field, a Duration/ID field, a Reception Address (RA) field, a Transmitting Address (TA) field, a BA Control field, a BA Information field, and a frame check sequence (FCS).

The RA field may be set as the address of an STA that has requested a block ACK.

The TA field may be set as the address of an STA that sends a BA frame.

The BA Control field includes a BA ACK Policy subfield, a Multi-TID subfield, a Compressed Bitmap subfield, a Reserved subfield, and a TID Information (TID_Info) subfield.

Table 6 illustrates the BA Control field.

TABLE 6

| SUBFIELD | BIT | DESCRIPTION |
| --- | --- | --- |
| BA ACK policy | 1 | Set to "0" when a sender requests an immediate ACK for data transmission.<br>Set to "1" when a sender does not request an immediate ACK for data transmission. |
| Multi-TID | 1 | Indicate the type of BA frame depending on the values of a |
| Compressed bitmap | 1 | Multi-TID subfield and a Compressed Bitmap subfield.<br>00: Basic BA<br>01: Compressed BA<br>10: Reserved value<br>11: Multi-TID BA |
| Reserved | 9 | |
| TID_Info | 4 | The meaning of a TID_Info field is determined by the type of BA frame.<br>Include TID that requests a BA frame in the case of a Basic BA frame, a Compressed BA frame.<br>Include the number of TIDs in the case of a Multi-TID BA frame |

The BA Information field includes different information depending on the type of BA frame. This is described below with reference to FIG. 18.

FIG. 18 is a diagram illustrating the BA Information field of the block ACK frame in a wireless communication system to which an embodiment of the present invention may be applied.

FIG. 18($a$) illustrates the BA Information field of a Basic BA frame, FIG. 18($b$) illustrates the BA Information field of a Compressed BA frame, and FIG. 18($c$) illustrates the BA Information field of a Multi-TID BA frame.

Referring to FIG. 18($a$), in the case of the Basic BA frame, the BA Information field includes a Block ACK Starting Sequence Control subfield and a Block ACK Bitmap subfield.

The Block ACK Starting Sequence Control subfield includes a Fragment Number field and a Starting Sequence Number subfield as described above.

The Fragment Number field is set to 0.

The Starting Sequence Number subfield includes the sequence number of the first MSDU for transmitting a corresponding BA frame, and is set as the same value as the Basic BAR frame that has been received right before.

The Block ACK Bitmap subfield has the length of 128 octets and is used to indicate the reception state of a maximum of 64 MSDUs. In the Block ACK Bitmap subfield, a value "1" indicates that an MPDU corresponding to a corresponding bit location has been successfully received. A value "0" indicates that an MPDU corresponding to a corresponding bit location has not been successfully received.

Referring to FIG. 18($b$), in the case of the Compressed BA frame, the BA Information field includes a Block ACK Starting Sequence Control subfield and a Block ACK Bitmap subfield.

The Block ACK Starting Sequence Control subfield includes a Fragment Number field and a Starting Sequence Number subfield as described above.

The Fragment Number field is set to 0.

The Starting Sequence Number subfield includes the sequence number of the first MSDU or A-MSDU for transmitting a corresponding BA frame, and is set as the same value as the Basic BAR frame that has been received right before.

The Block ACK Bitmap subfield has the length of 8 octets and is used to indicate the reception state a maximum of 64 MSDUs and A-MSDUs. In the Block ACK Bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

Referring to FIG. 18($c$), in the case of the Multi-TID BA frame, the BA Information field is configured in such a manner that a Per TID Info subfield, a Block ACK Starting Sequence Control subfield, and a Block ACK Bitmap subfield are repeated for one or more TIDs and is configured in order of an increasing TID.

The Per TID Info subfield includes a Reserved subfield and a TID Value subfield. The TID Value subfield includes a TID value.

The Block ACK Starting Sequence Control subfield includes a fragment number and a Starting Sequence Number subfield as described above. The Fragment Number field is set to 0. The Starting Sequence Control subfield includes the sequence number of the first MSDU or A-MSDU for transmitting a corresponding BA frame.

The Block ACK Bitmap subfield has a length of 8 octets. In the Block ACK Bitmap subfield, a value "1" indicates that a single MSDU or A-MSDU corresponding to a corresponding bit location has been successfully received. A value "0" indicates that a single MSDU or A-MSDU corresponding to a corresponding bit location has not been successfully received.

Uplink Single User/Multi-User Transmitting Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

In the following description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 19 is a diagram illustrating a high efficiency (HE) format PPDU according to an embodiment of the present invention.

FIG. 19(a) illustrates a schematic configuration of the HE format PPDU, and FIGS. 19(b) to 19(d) illustrate more detailed configurations of the HE format PPDU.

Referring to FIG. 19(a), the HE format PPDU for an HEW may basically include a legacy part (L-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, an HE-SIG field, and an HE-LTF. In FIG. 19(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 19(b), the HE-SIG field may be divided into an HE-SIG-A field and an HE-SIG-B field.

For example, the HE-part of the HE format PPDU may include an HE-SIG-A field having a length of 12.8 μs, an HE-STF of 1 OFDM symbol, one or more HE-LTFs, and an HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 19(b), the positions of the HE-SIG-A field and the HE-SIG-B field may be different from those of FIG. 19(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 19(c), the HE-SIG field may not be divided into an HE-SIG-A field and an HE-SIG-B field.

For example, the HE-part of the HE format PPDU may include an HE-STF of 1 OFDM symbol, an HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 19(d), the HE-SIG field is not divided into an HE-SIG-A field and an HE-SIG-B field, and the HE-LTF may be omitted.

For example, the HE-part of the HE format PPDU may include an HE-STF of 1 OFDM symbol and an HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 160 MHz frequency band through a total of four 20 MHz channels. This is described in more detail.

An HE format PPDU for a WLAN system to which an embodiment of the present invention may be applied may be transmitted through at least one 20 MHz channel. For example, the HE format PPDU may be transmitted in a 40

MHz, 80 MHz or 160 MHz frequency band through a total of four 20 MHz channels. This is described in more detail below with reference to the following drawing.

The following PPDU format is described based on FIG. 25(b), for convenience of description, but the present invention is not limited thereto.

FIG. 20 is a diagram illustrating an HE format PPDU according to an embodiment of the present invention.

FIG. 20 illustrates a PPDU format if an 80 MHz frequency band has been allocated to one STA (or if an OFDMA resource unit has been allocated to a plurality of STAs within an 80 MHz frequency band) or if different streams each having an 80 MHz frequency band have been allocated to a plurality of STAs.

Referring to FIG. 20, an L-STF, an L-LTF, and an L-SIG field may be transmitted in an OFDM symbol generated based on 64 FFT points (or 64 subcarriers) in each 20 MHz channel.

An HE-SIG A field may include common control information in common transmitted to STAs that receive a PPDU. The HE-SIG A field may be transmitted in one to three OFDM symbols. The HE-SIG A field may be duplicated in a 20 MHz unit and includes the same information. Furthermore, the HE-SIG-A field provides notification of information about the full bandwidth of a system.

Table 7 illustrates information included in the HE-SIG A field.

through four 20 MHz channels (i.e., 80 MHz bands), the L-STF, the L-LTF, the L-SIG field, and the HE-SIG A field may be repeated every 20 MHz channel and transmitted.

If the size of FFT increases, a legacy STA supporting the existing IEEE 802.11a/g/n/ac may not decode a corresponding HE PPDU. In order for a legacy STA and an HE STA to coexist, the L-STF, L-LTF, and the L-SIG field are transmitted through 64 FFT in a 20 MHz channel so that a legacy STA can receive them. For example, the L-SIG field may occupy one OFDM symbol, and one OFDM symbol time may be 4 μs, and a GI may be 0.8 μs.

The size of FFT for each frequency unit may be further increased from the HE-STF (or the HE-SIG A field). For example, 256 FFT may be used in a 20 MHz channel, 512 FFT may be used in a 40 MHz channel, and 1024 FFT may be used in an 80 MHz channel. If the size of FFT increases, the number of OFDM subcarriers per unit frequency increases because spacing between the OFDM subcarriers is reduced, but the OFDM symbol time is increased. In order to improve efficiency of a system, the length of a GI after the HE-STF may be set to be the same as that of the HE-SIG A field.

The HE-SIG A field may include information which is required for an HE STA to decode an HE PPDU. However, the HE-SIG A field may be transmitted through 64 FFT in a 20 MHz channel so that both a legacy STA and an HE STA can receive the HE-SIG A field. The reason for this is that the

TABLE 7

| FIELD | BIT | DESCRIPTION |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicate the position or number of spatial streams for each STA or indicate the position or number of spatial streams for a group of STAs |
| UL indication | 1 | Indicate whether a PPDU is directed toward an AP (uplink) or an STA (downlink) |
| MU indication | 1 | Indicate whether a PPDU is an SU-MIMO PPDU or an MU-MIMO PPDU |
| GI indication | 1 | Indicate whether a short GI or a long GI is used |
| Allocation information | 12 | Indicate a band or channel (a subchannel index or subband index) allocated to each STA in a band in which a PPDU is transmitted |
| Transmission power | 12 | Indicate transmission power for each channel or each STA |

Pieces of information included in each of the fields illustrated in Table 7 may comply with the definition of the IEEE 802.11 system. Furthermore, each of the aforementioned fields corresponds to an example of fields which may be included in a PPDU, but is not limited thereto. That is, each of the aforementioned fields may be replaced with another field or an additional field may be further included and all of the fields may not be essentially included.

The HE-STF is used to improve performance of AGC estimation in MIMO transmission.

The HE-SIG B field may include user-specific information which is required for each of STAs to receive its data (e.g., a PSDU). The HE-SIG B field may be transmitted in one or two OFDM symbols. For example, the HE-SIG B field may include information about a modulation and coding scheme (MCS) for a corresponding PSDU and the length of the corresponding PSDU.

The L-STF, L-LTF, the L-SIG field, and the HE-SIG A field may be repeated in a 20 MHz channel unit and transmitted. For example, when a PPDU is transmitted HE STA has to receive an existing HT/VHT format PPDU in addition to an HE format PPDU and a legacy STA and the HE STA have to distinguish the HT/VHT format PPDU from the HE format PPDU.

FIG. 21 is a diagram illustrating a HE format PPDU according to an embodiment of the present invention.

In FIG. 21, it is assumed that 20 MHz channels are allocated to different STAs (e.g., an STA 1, an STA 2, an STA 3, and an STA 4).

Referring to FIG. 21, in this case, the size of FFT per unit frequency may be further increased after an HE-STF (or the HE-SIG B field). For example, 256 FFT may be used in a 20 MHz channel, 512 FFT may be used in a 40 MHz channel, and 1024 FFT may be used in an 80 MHz channel from the HE-STF (or the HE-SIG B field).

Information transmitted in each of the fields included in the HE format PPDU is the same as that of FIG. 26, and a description thereof is omitted.

The HE-SIG B field may include information specified for each of the STAs, but may be encoded in a full band (i.e., indicated in the HE-SIG-A field). That is, the HE-SIG B field includes information about all of the STAs and is received by all of the STAs.

The HE-SIG B field may provide notification of information about a frequency bandwidth allocated to each of the STAs and/or stream information in a corresponding frequency band. For example, in the HE-SIG-B field of FIG. 28, a 20 MHz frequency band may be allocated to the STA 1, a next 20 MHz frequency band may be allocated to the STA 2, a next 20 MHz frequency band may be allocated to the STA 3, and a next 20 MHz frequency band may be allocated to the STA 4. Furthermore, a 40 MHz frequency band may be allocated to the STA 1 and the STA 2, and a next 40 MHz frequency band may be allocated to the STA 3 and the STA 4. In this case, different streams may be allocated to the STA 1 and the STA 2, and different streams may be allocated to the STA 3 and the STA 4.

Furthermore, an HE-SIG-C field may be defined and added to the example of FIG. 27. In this case, in the HE-SIG-B field, information about all of the STAs may be transmitted in a full band, and control information specific to each of the STAs may be transmitted in a 20 MHz unit through the HE-SIG-C field.

Furthermore, in the examples of FIGS. 20 and 21, the HE-SIG-B field is not transmitted in a full band, but may be transmitted in a 20 MHz unit like the HE-SIG-A field. This is described below with reference to related drawings.

FIG. 22 is a diagram illustrating a HE format PPDU according to an embodiment of the present invention.

In FIG. 22, it is assumed that 20 MHz channels are allocated to different STAs (e.g., STA 1, STA 2, STA 3, and STA 4).

Referring to FIG. 22, the HE-SIG-B field is not transmitted over an entire band but transmitted in a unit of 20 MHz, as in the HE-SIG-A field. However, in this case, the HE-SIG-B is encoded in a unit of 20 MHz and transmitted, unlike the HE-SIG-A field, but the HE-SIG-B may not be duplicated in a unit of 20 MHz and transmitted.

In this case, the FFT size per unit frequency may further increase from an HE-STF (or HE-SIG B). For example, from the HE-STF (or the HE-SIG B), 256 FFT may be used in a 20 MHz channel, 512 FFT may be used in a 40 MHz channel, and 1024 FFT may be used in an 80 MHz channel.

Information transmitted from each field included in the PPDU is the same as that of an illustration of FIG. 20, and therefore a description thereof is omitted.

The HE-SIG-A field is duplicated in a unit of 20 MHz and transmitted.

The HE-SIG B field may notify frequency bandwidth information allocated on each STA basis and/or stream information in a corresponding frequency band. The HE-SIG-B field includes information about each STA and information about each STA can be included for each HE-SIG-B field of a 20 MHz unit. In this case, FIG. 28 illustrates a case in which 20 MHz is assigned on each STA basis, but for example, when 40 MHz is assigned to the STA, the HE-SIG-B field may be duplicated and transmitted in a unit of 20 MHz.

In a situation of supporting different bandwidths on each BSS basis, when allocating some bandwidths having a small interference level from an adjacent BSS to the STA, as described above, it may be preferable not to transmit the HE-SIG-B field over an entire band.

In FIGS. 20 to 22, the data field is a payload and may include a service field, a scrambled PSDU, tail bits, and padding bits.

A HE format PPDU of FIGS. 20 to 22 may be classified through a Repeated L-SIG (RL-SIG) field, which is a repetition symbol of an L-SIG field. The RL-SIG field is inserted in front of the HE SIG-A field, and each STA may classify a format of the PPDU received using the RL-SIG field into the HE format PPDU.

A method in which an AP operating in a WLAN system transmits data to a plurality of STAs on the same time resource may be referred to as downlink multi-user (DL MU) transmission. In contrast, a method in which a plurality of STAs operating in a WLAN system transmits data to an AP on the same time resource may be referred to as uplink multi-user transmission.

Such DL MU transmission or UL MU transmission may be multiplexed on a frequency domain or a spatial domain.

When multiplexed on a frequency domain, different frequency resources (e.g., subcarrier or tone) may be allocated as a downlink or uplink resource to each of a plurality of STAs based on orthogonal frequency division multiplexing (OFDMA). A transmitting method through different frequency resources in the same time resource may be referred to as 'DL/UL OFDMA transmission'.

When multiplexed on a spatial domain, different space stream may be allocated as a downlink or uplink resource to each of a plurality of STAs. A transmitting method through different spatial stream in the same time resource may be referred to as 'DL/UL MU MIMO'.

Hereinafter, a multi-user uplink transmitting method in a WLAN system will be described.

A current WLAN system does not support UL MU transmission due to the following restrictions.

The current WLAN system does not support synchronization of transmitting timing of uplink data transmitted from a plurality of STAs. For example, in an existing WLAN system, when it is assumed that a plurality of STAs transmit uplink data through the same time resource, in the current WLAN system, a plurality of STAs each may not know transmitting timing of uplink data of other STAs. Therefore, the AP cannot receive uplink data from each of a plurality of STAs on the same time resource.

Further, in the current WLAN system, frequency resources used for transmitting uplink data by a plurality of STAs may be overlapped. For example, when oscillators of each of a plurality of STAs are different, frequency offset may be differently represented. When a plurality of STAs each having different frequency offset simultaneously transmit an uplink through different frequency resources, a portion of a frequency domain used by each of a plurality of STAs may be overlapped.

Further, in an existing WLAN system, a power control for each of a plurality of STAs is not performed. The AP dependent on a channel environment and a distance between each of the plurality of STAs and the AP may receive a signal of different power from each of the plurality of STAs. In such a case, a signal arriving with weak power may be relatively difficulty detected by the AP, compared with a signal arriving with strong power.

Accordingly, the present invention provides a UL MU transmitting method in a WLAN system.

FIG. 23 is a diagram illustrating an uplink multi-user transmitting procedure according to an embodiment of the present invention.

Referring to FIG. 23, the AP instructs to prepare UL MU transmission to STAs participating in UL MU transmission, receives a UL MU data frame from corresponding STAs, and transmits an ACK frame (Block Ack (BA) frame) in response to the UL MU data frame.

First, by transmitting a UL MU trigger frame 2310, the AP instructs to prepare UL MU transmission to STAs to transmit UL MU data. Here, an UL MU scheduling frame may be referred to as a term 'UL MU scheduling frame'.

Here, the UL MU trigger frame 2310 may include control information such as STA identifier (ID)/address information, resource allocation information to be used by each STA, and duration information.

The STA ID/address information means information about an identifier or an address for specifying each STA that transmits uplink data.

The resource allocation information means information about an uplink transmitting resource (e.g., frequency/subcarrier information assigned to each STA in UL OFDMA transmission, stream index assigned to each STA in UL MU MIMO transmission) assigned on each STA basis.

The duration information means information for determining a time resource for transmission of an uplink data frame transmitted by each of a plurality of STAs.

For example, the duration information may include interval information of a Transmit Opportunity (TXOP) allocated for uplink transmission of each STA or information (e.g., bit or symbol) about an uplink frame length.

Further, the UL MU trigger frame 2310 may further include control information such as MCS information and coding information that should use upon transmitting an UL MU data frame on each STA basis.

The control information may be transmitted from a HE-part (e.g., a HE-SIG-A field or a HE-SIG-B field) of the PPDU that carries the UL MU trigger frame 2310 or a control field (e.g., a Frame Control field of the MAC frame) of the UL MU trigger frame 2310.

The PPDU that carries the UL MU trigger frame 2310 has a structure starting from an L-part (e.g., L-STF field, L-LTF field, and L-SIG field). Accordingly, legacy STAs may set a Network Allocation Vector (NAV) from the L-SIG field through L-SIG protection. For example, legacy STAs may calculate an interval (hereinafter, 'L-SIG guard interval') for NAV setting based on information about a data length and a data rate in the L-SIG. The legacy STAs may determine that there is no data to be transmitted thereto for the calculated L-SIG guard interval.

For example, the L-SIG guard interval may be determined with the sum of a MAC duration field value of the UL MU trigger frame 2310 and the remaining intervals after the L-SIG field of the PPDU that carries the UL MU trigger frame 2310. Accordingly, the L-SIG guard interval may be set to a value to an interval that transmits the ACK frame 2330 (or BA frame) transmitted to each STA according to a MAC duration value of the UL MU trigger frame 2310.

Hereinafter, a method of allocating a resource for UL MU transmission to each STA will be described in detail. For convenience of description, a field including control information is divided, but the present invention is not limited thereto.

The first field may classify and indicate UL OFDMA transmission and UL MU MIMO transmission. For example, when the first field is '0', the first field may indicate UL OFDMA transmission, and when the first field is '1', the first field may indicate UL MU MIMO transmission. A size of the first field may be 1 bit.

The second field (e.g., STA ID/address field) notifies an STA ID or STA address to participate in UL MU transmission. A size of the second field may be configured with the bit number for notifying the STA ID×the STA number to participate in UL MU. For example, when the second field is 12 bits, the second field may indicate an ID/address of each STA on 4 bit basis.

For UL MU transmission, the third field (e.g., resource allocation field) indicates a resource area applied to each STA. In this case, a resource area applied to each STA may be sequentially indicated to each STA in order of the second field.

When the first field value is '0', the first field represents frequency information (e.g., frequency index, subcarrier index) for UL MU transmission in order of the STA ID/address included in the second field, and when the first field value is '1', the first field represents MIMO information (e.g., stream index) for UL MU transmission in order of the STA ID/address included in the second field.

In this case, because the third field may notify several indexes (i.e., frequency/subcarrier index or stream index) of one STA, a size of the third field may be configured with a plurality of bits (or may be configured in a bitmap format)× the STA number to participate in UL MU transmission.

For example, it is assumed that the second field is set in order of 'STA 1' and 'STA 2' and that the third field is set in order of 2' and '2'.

In this case, when the first field is '0', in the STA 1, a frequency resource is allocated from a superordinate (or subordinate) frequency domain, and in the STA 2, next frequency resources may be sequentially allocated. For example, in a 80 MHz band, when OFDMA of a 20 MHz unit is supported, the STA 1 may use a superordinate (or subordinate) 40 MHz band, and the STA 2 may use a next 40 MHz band.

However, when the first field is '1', in the STA 1, superordinate (or subordinate) stream is allocated, and in the STA 2, next stream may be sequentially allocated. In this case, a beamforming method according to each stream may be previously designated or in a third field or a fourth field, more detailed information about a beamforming method according to stream may be included.

Each STA transmits UL MU data frames 2321, 2322, and 2323 to the AP based on the UL MU trigger frame 2310 transmitted by the AP. Here, each STA may receive the UL MU trigger frame 2310 from the AP and transmit UL MU data frames 2321, 2322 and 2323 to the AP after SIFS.

The each STA may determine a specific frequency resource for UL OFDMA transmission based on resource allocation information of the UL MU trigger frame 2310 or spatial stream for UL MU MIMO transmission.

Specifically, in UL OFDMA transmission, each STA may transmit an uplink data frame on the same time resource through different frequency resources.

Here, the STA 1 to the STA 3 each may receive allocation of different frequency resources for uplink data frame transmission based on STA ID/address information and resource allocation information included in the UL MU trigger frame 3110. For example, STA ID/address information may sequentially indicate the STA 1 to the STA 3, and resource allocation information may sequentially indicate a frequency resource 1, a frequency resource 2, and a frequency resource 3. In this case, the STA 1 to the STA 3 sequentially indicated based on STA ID/address information may receive allocation of the frequency resource 1, the frequency resource 2, and the frequency resource 3, respectively, sequentially indicated based on resource allocation information. That is, the STA 1 may transmit uplink data frames 2321, 2322, and 2323 to the AP through the frequency resource 1, the STA 2 may transmit uplink data frames 2321, 2322, and 2323 to the AP through the frequency resource 2, and the STA 3 may transmit uplink data frames 2321, 2322, and 2323 to the AP through the frequency resource 3.

Further, in UL MU MIMO transmission, each STA may transmit an uplink data frame on the same time resource through at least one different stream of a plurality of spatial stream.

Here, the STA 1 to the STA 3 each may receive allocation of spatial stream for uplink data frame transmission based on STA ID/address information and resource allocation information included in the UL MU trigger frame 2310. For example, the STA ID/address information may sequentially indicate the STA 1 to the STA 3, and the resource allocation information may sequentially indicate spatial stream 1, spatial stream 2, and spatial stream 3. In this case, the STA 1 to the STA 3 sequentially indicated based on the STA ID/address information may receive allocation of spatial stream 1, spatial stream 2, and spatial stream 3, respectively, sequentially indicated based on resource allocation information. That is, the STA 1 may transmit uplink data frames 2321, 2322 and 2323 to the AP through spatial stream 1, the STA 2 may transmit uplink data frames 2321, 2322 and 2323 to the AP through spatial stream 2, and the STA 3 may transmit uplink data frames 2321, 2322 and 2323 to the AP through spatial stream 3.

As described above, a transmission duration (or transmission termination time point) of uplink data frames 2321, 2322, and 2323 transmitted by each STA may be determined by MAC duration information included in the UL MU trigger frame 2310. Therefore, each STA may synchronize transmission termination time points of uplink data frames 2321, 2322, and 2323 (or an uplink PPDU that carries an uplink data frame) through bit padding or fragmentation based on a MAC duration value included in the UL MU trigger frame 2310.

The PPDU that carries the uplink data frames 2321, 2322, and 2323 may be formed in a new structure even without an L-part.

Further, in a case of UL MU MIMO transmission or in a case of UL OFDMA transmission of a subband form of less than 20 MHz, an L-part of a PPDU that carries uplink data frames 2321, 2322 and 2323 may be transmitted in a Single Frequency Network (SFN) form (i.e., an entire STA simultaneously transmits the same L-part configuration and contents). However, in a case of UL OFDMA transmission of a subband form of 20 MHz or more, an L-part of a PPDU that carries the uplink data frames 2321, 2322 and 2323 may be transmitted in a 20 MHz unit in a band in which each STA is allocated.

As described above, in the UL MU trigger frame 2310, a MAC duration value may be set to a value to an interval that transmits the ACK frame 2330, and an L-SIG guard interval may be determined based on a MAC duration value. Therefore, the legacy STA may set a NAV to the ACK frame 3130 through an L-SIG field of the UL MU trigger frame 2310.

When an uplink data frame may be fully configured with information of the UL MU trigger frame 2310, a HE-SIG field (i.e., an area that transmits control information about a data frame configuration method) within a PPDU that carries the UL MU trigger frame 2310 may not be required. For example, the HE-SIG-A field and/or the HE-SIG-B field may not be transmitted. Further, the HE-SIG-A field and the HE-SIG-C field may be transmitted, and the HE-SIG-B field may not be transmitted.

The AP may transmit an ACK frame 2330 (or BA frame) in response to uplink data frames 2321, 2322, and 2323 received from each STA. Here, the AP may receive uplink data frames 2321, 2322, and 2323 from each STA and transmit the ACK frame 2330 to each STA after SIFS.

When a structure of an existing ACK frame is equally used, an RA field having a size of 6 octets may include AID (or Partial AID) of STAs participating in UL MU transmission.

Alternatively, when an ACK frame of a new structure is configured, the ACK frame may be configured in a form for DL SU transmission or DL MU transmission. That is, in a case of DL SU transmission, the ACK frame 2330 may be sequentially transmitted to each STA participating in UL MU transmission, and in a case of DL MU transmission, the ACK frame 2330 may be simultaneously transmitted to each STA participating in UL MU transmission through a resource (i.e., frequency or stream) allocated to each STA.

The AP may transmit only the ACK frame 2330 of a UL MU data frame succeeded in reception to a corresponding STA. Further, the AP may notify with ACK or NACK whether reception is succeeded through the ACK frame 2330. When the ACK frame 2330 includes NACK information, the ACK frame 2330 may include information (e.g., UL MU scheduling information) for a subsequent procedure or the reason of NACK.

Alternatively, the PPDU that carries the ACK frame 3130 may be formed in a new structure without an L-part.

The ACK frame 2330 may include STA ID or address information, but when order of STAs indicated in the UL MU trigger frame 2310 is equally applied, the ACK frame 2330 may omit STA ID or address information.

Further, a frame for next UL MU scheduling by extending a TXOP (i.e., L-SIG guard interval) of the ACK frame 2330 and a control frame including adjustment information for next UL MU transmission may be included within the TXOP.

For UL MU transmission, an adjustment process of corresponding synchronization between STAs before or within a procedure of FIG. 23 may be added.

Hereinafter, the present invention provides a method of configuring a frame structure including both single user (SU) transmission and multi-user (MU) transmission.

In the present invention, MU transmission includes an entire case in which multi-users simultaneously transmit in the same time domain, as in OFDMA or MU MIMO.

Hereinafter, in a description of the present invention, a 'frame' may mean a DL/UL MAC frame (i.e., MAC control frame, MAC management frame, or data frame) self and may mean a DL/UL (SU/MU) PPDU that carries the DL/UL MAC frame.

Definition of Each Mode

1) DL SU and DL MU: in a downlink, i.e., when the AP transmits a signal to STAs, the difference between the SU and the MU represents whether the AP allocates an entire band (e.g., bandwidth of the PPDU) to one STA or several STAs.

However, in the DL, the AP contends and transmits a channel regardless of the SU or the MU, and because a limitation problem of power of the AP is less than that of the STA, the AP does not require a separate distinction. Further, in an OFDMA structure, even if the SU is used, the AP generally allocates an entire band to one STA.

2) UL SU: in an uplink, i.e., when the STA transmits a signal to the AP, the STA secures and transmits a medium through direct channel contending without a trigger frame of the AP. Hereinafter, in a description of the present invention, when a trigger frame exists, a case in which only one STA transmits an uplink data frame is referred to as an UL MU.

3) UL MU: in an uplink, i.e., when the STA transmits a signal to the AP, the AP previously transmits a DL frame (e.g., trigger frame) and the STA secures a channel to transmit a UL data frame and transmits an UL signal. That is, in a channel that is not occupied by the DL frame (e.g., trigger frame), an uplink resource is not allocated.

For example, the AP may transmit a trigger frame, and the STA may transmit an UL frame according to the indication. In this case, as described above, even if one STA transmits an UL frame, in a channel secured by the DL frame, when the STA transmits the UL frame, it is referred to as an UL MU. That is, when a trigger frame is transmitted, even if only one STA transmits an UL data frame, it is an UL MU.

Hereinafter, when describing the present invention, a HE-SIG1 field may be referred to as an HE-SIG-A field, and a HE-SIG2 field may be referred to as an HE-SIG-B field.

FIG. 24 is a diagram illustrating UL MU transmission according to an embodiment of the present invention.

In FIG. 24, when the AP transmits a trigger frame, MU STAs transmit UL data. However, any STA within the BSS may not recognize that an UL MU frame exists.

In FIG. 24, other STA1 receives a trigger frame within the BSS, but does not receive an UL MU frame. Therefore, other STA1 may receive the trigger frame and transmit UL data to the AP after EIFS (EIFS=aSIFSTime+DIFS+Estimate-dACKTxTime). In a legacy 801.11 system, the AP may receive the UL MU frame and complete transmission of an ACK frame within EIFS. However, because a length of an UL MU packet of a 11ax system may be longer than that of a legacy system, an UL frame in which other STA1 transmits after EIFS may collide with UL MU data communication by the trigger frame.

FIG. 25 is a diagram illustrating UL MU transmission according to an embodiment of the present invention.

In FIG. 25, the AP transmits a trigger frame, and MU STAs transmit UL data. However, any STA of OBSS may not recognize existence of a trigger frame and an ACK frame.

In FIG. 25, other STA2 does not overhear a trigger frame. Other STA2 may overhear only an UL MU frame. Therefore, other STA2 may transmit a packet thereof after EIFS from termination of the UL MU frame. However, because a length of the DL MU ACK frame may be longer than that of a legacy ACK/BA frame, the DL MU ACK frame may collide with a frame in which other STA2 transmits and an ACK frame in which MU STAs transmit.

In an UL MU procedure of FIGS. 24 and 25, additional TXOP protection for preventing collision with transmitting data of other STAs is required. Hereinafter, TXOP protection for such a UL MU procedure will be described.

A TXOP means a transmission opportunity. In other words, the TXOP represents an interval of time when a particular Quality of Service (QoS) STA has the right to initiate frame exchange sequence onto the wireless medium (WM). The TXOP may be defined to a start time and a maximum duration. The TXOP may be acquired by successful channel contending of the STA or may be allocated by a Hybrid Coordinator (HC). The TXOP protection means interference prevention of other STAs for a frame transmitting and receiving interval of the STA for protection of such TXOP. For example, by NAV setting of other STAs other than an STA, which is a transmitting and receiving target at an interval of transmitting and receiving data thereof, a specific STA may protect a TXOP thereof. Hereinafter, a length of a TXOP related frame may mean a length of a time domain.

For TXOP protection, the above-described L-SIG TXOP protection may be applied. The L-SIG TXOP protection is used for representing a PPDU length or is used for representing a TXOP duration in a 802.11n system. An L-SIG length value of the trigger frame and/or the UL MU frame may be used for setting a TXOP length. When a length field value of L-SIG of the trigger frame and/or the UL MU frame is set to a TXOP length, both a legacy STA and 11ax STA may analyze the duration to a PPDU length or a TXOP length and set a NAV by a length field value of the L-SIG.

However, when using L-SIG TXOP protection, the legacy STA may recognize an L-SIG length to a PPDU length instead of setting a NAV with an L-SIG length. Therefore, when data are not detected for a PPDU length according to implementation of a transmitting and receiving device, the legacy STA may be changed to an idle state to attempt again medium access. Further, because a resource of the L-SIG is very limited, there is a problem that a value that can signal is limited. Because the L-SIG includes a parity bit of only 1 bit, there is a problem that reliability of data is deteriorated. Finally, outdoor STAs may not well decode the L-SIG. Hereinafter, a TXOP protection method that does not use length information included in the L-SIG field will be described.

TXOP protection may be performed using a trigger frame. The trigger frame may use a legacy PPDU format or a 11ax PPDU format.

When the trigger frame is formed in a legacy PPDU format, a legacy STA, having received the trigger frame may set a TXOP using a duration field included in a MAC header. When the trigger frame is formed in a 11ax PPDU format, a legacy STA may not set a TXOP.

When a trigger frame is a legacy PPDU, an 11ax STA, having received the trigger frame may set a TXOP using a duration field included in a MAC header. When the trigger frame is formed in a 11ax PPDU format, the 11ax STA may set a TXOP using a duration field included in a MAC header. However, when a SIG B field of the trigger frame includes STA specific information, other STAs may not decode a MAC header. Particularly, in FIG. 25, when an STA of the OBSS decodes headers up to a MAC header of a signal frame of other BSSs to set a TXOP, system efficiency may be deteriorated. Therefore, the present invention provides a method of setting a TXOP using an HE-SIG field.

The present invention provides a TXOP protection method of an UL MU procedure using a length field. In this specification, a length may be referred to as a duration. Length/duration information may be represented with a micro second (μs) unit or a symbol unit and may be signaled in a bit or octet (byte) unit. In an embodiment of the present invention, positions of the HE-SIG-A field and the HE-SIG-B field may be changed, and a HE-SIG-C field may be added. For convenience, HE-SIG-A/B/C fields have been divided and described, but the entire or some of a description on the HE-SIG-A field may be applied to the HE-SIG-B field. When two HE-SIG-B fields exist in a continuous form, the two HE-SIG-B fields may be referred to as a HE-SIG-B field and a HE-SIG-C field.

FIG. 26 is a diagram illustrating a HE frame according to an embodiment of the present invention.

In FIG. 26, a HE PPDU includes legacy preambles L-STF, L-LTF, and L-SIG, HE preambles HE-SIG-A, HE-SIG-B, HE-STF, and HE-LTF, and a payload. In FIG. 26, the PPDU is a payload and includes a MPDU, and the MPDU further includes a MAC header, a payload, and a Frame Check Sequence (FCS).

The L-SIG field may include a length field. When a length field of the L-SIG field is used for TXOP protection, the length field may be used for NAV setting of a TXOP interval 1 including a frame following immediately after a current frame. In FIG. 26, a following frame transmitted and received immediately after a current frame is represented with an ACK frame. However, a following frame transmitted and received immediately after a current frame may be an ACK frame or a BA frame. Further, when a current frame is an RTS frame, a subsequent frame may be a CTS frame. That is, a length field may indicate a duration 1 that completes a transmitting and receiving procedure including a current frame. When a length field of the L-SIG field is not used for TXOP protection, the length field may indicate a length of a current frame.

The HE-SIG-A field may include an HE-SIG-B length field indicating a length 2 of the HE-SIG-B field.

The HE-SIG-A field may include a length field indicating a length 3 of a current frame. The length field may be included in the HE-SIG-B field. When a length field of the L-SIG field is not used for TXOP protection, a length field of the HE-SIG field may be omitted.

A length field may be included in the MAC header. The length field of the MAC header may be used for TXOP protection. The length field of the MAC header indicates a length 4 including a length of the remaining frames and a length of a continuously transmitted and received frame and may be used for NAV setting.

FIG. 27 is a diagram illustrating a UL MU procedure and TXOP protection according to an embodiment of the present invention.

FIG. 27 illustrates an UL MU procedure in which the AP STA transmits a trigger frame and in which a plurality of STAs transmit an UL MU frame according to the trigger frame and in which the AP STA transmits an ACK frame. FIG. 27 illustrates an operation on one STA of a plurality of STAs that transmit an UL MU frame. FIG. 27 illustrates an embodiment in which a trigger frame is transmitted as a PHY structure, but a frame of FIG. 27 may be a MAC frame structure including a MPDU.

The L-SIG field of the trigger frame may include a length field. When the length field of the L-SIG field is used for TXOP protection, the length field may be used for NAV setting of a length 1 including an UL MU procedure.

The HE-SIG-A field of the trigger frame may include a HE-SIG-B length field indicating a length 2 of the HE-SIG-B field. The HE-SIG-B field of the trigger frame includes information about UL MU transmission. In an embodiment, the HE-SIG-B field is used for a DL, a HE-SIG-C field may be additionally included in the HE-SIG-B field, and in such a case, the HE-SIG-B field may include a length field of the HE-SIG-C field.

The HE-SIG-A field of the trigger frame may include a field indicating a length 3 for TXOP protection. The length field for TXOP protection may be referred to as a TXOP protection field or a TXOP duration (interval) field. The TXOP duration field may indicate the remaining time/interval length in a frame exchange procedure of the STA. A TXOP interval in which the TXOP duration field represents may include a length of subsequent frames. As shown in FIG. 27, the TXOP interval may include a length of a UL MU frame and a length of an ACK frame. In another embodiment, the TXOP interval may further include the remaining signal frame portions after a signal field including a TXOP duration field. The TXOP duration field may be used by 11ax STA of an outdoor/weak channel failed in decoding of the L-SIG field. However, the TXOP duration field may be used by entire 11ax STAs. A TXOP duration in which the TXOP duration field represents may represent a length from the end of the HE-SIG-A field to the end of the ACK frame. The TXOP duration of the trigger frame may further include an Inter Frame Space (IFS) time between the trigger frame and the UL MU frame and an IFS time between the UL MU frame and the ACK frame.

The trigger frame may be transmitted in a MAC structure, and in this case, analysis of a length field of the 11ax frame may be used. The TXOP protection interval is an entire UL MU procedure including an interval of the UL MU frame and the ACK frame. In this case, the L-SIG length field may indicate a current frame length, and a length field of the MAC header may indicate a TXOP length.

FIG. 28 is a diagram illustrating a UL MU procedure and TXOP protection according to an embodiment of the present invention and particularly illustrates an example of a cascade structure in which a UL MU procedure is transmitted together with a DL MU frame.

In FIG. 28, a description on fields of lengths (1), (2), (3), and (5) is the same as that of FIGS. 26 and 27. However, in an embodiment of FIG. 28, two SIG-B fields are included. Two HE-SIG-B fields may be two separately coded HS-SIG-B fields. That is, two HE-SIG-B fields each may include information of the DL and information of the UL. In an embodiment, one HE-SIG-B field including information of the DL and information of the UL may be included. In such a case, because the HE-SIG-B field is extended, a performance may be deteriorated. Hereinafter, an embodiment including two HE-SIG-B fields will be described.

When a frame includes two HE-SIG-B fields, an indicator is required in which a general 11ax frame includes one HE-SIG-B field and in which a cascade frame includes two HE-SIG-B fields. Even in a case in which a frame includes one HE-SIG-B field, an indicator may be required in which one HE-SIG-B field represents DL information or UL information. Additionally, an indicator indicating whether the frame is a MAC frame or a PHY frame may be required.

Therefore, a frame according to an embodiment of the present invention may add a 1 bit indicator to the HE-SIG-B to indicate whether the frame is a general 11ax MAC frame. Even in a case in which a frame has a cascade format, a HE-SIG-B field for trigger information may be always included in front of the 11ax MAC frame. The STA, having received such a frame may process a receiving frame according to an indication bit value of the HE-SIG-B field.

In an embodiment, when a value of an indicator 1 bit of the HE-SIG-B field is 0x0, the receiving STA recognizes and decodes a frame as a frame of FIG. 26, and when a value of 1 bit is 0x1, the receiving STA recognizes the HE-SIG-B field as trigger information to acquire information for UL transmission and determine whether an additional HE-SIG-B field exists. The HE-SIG-B field analyzed as trigger information may include a length field of the additional HE-SIG-B field. When a value of such a length field is 0, the receiving STA may recognize a corresponding frame as a trigger PHY frame having no additional HE-SIG-B. That is, when a length value of the receiving STA is 0, a frame may be analyzed, as in an embodiment described with reference to FIG. 27, and when a length value of the receiving STA is 1, a frame may be analyzed, as in an embodiment described with reference to FIG. 28.

In an embodiment, two or more HE-SIG-B fields may exist. For example, three HE-SIG-B fields may be used for the DL, for an UL buffer state/channel state report, and for UL data transmission. In order to indicate continued UL transmission, an ACK/BA frame of the AP transmitted after receiving the UL frame may perform a function of a polling frame indicating next UL transmission. In such a case, an ACK/BA+polling frame may be transmitted instead of the ACK/BA frame. In this case, contents constituting the HE-SIG-B field may be changed according to each object. For example, when length information of (3) is transmitted to the HE-SIG-B field, a length field of (3) may not be included in the HE-SIG-B field used for UL control and length information of (3) may be included in the HE-SIG-B field used for transmitting DL information.

In another embodiment, the HE-SIG-A field may signal the entire of the number of HE-SIG-B fields, MCS information, and length information. Alternatively, the HE-SIG-A field represents MCS information and length information of a first preceding HE-SIG-B field, and a preceding HE-SIG-B field may represent MCS information and length information of next HE-SIG-B field. In an embodiment, order of HE-SIG-B fields may include information about a preceding HE-SIG-B field having a more robust MCS and a following HE-SIG-B field.

FIG. 29 is a diagram illustrating a UL MU procedure and TXOP protection according to an embodiment of the present invention and illustrates an example of a cascade structure in which a UL MU procedure is together transmitted with a DL MU frame. Particularly, FIG. 29 illustrates an embodiment of a cascade structure when trigger information is transmitted to the MAC frame.

As shown in FIG. 29, the DL frame includes one MAC header+payload+FCS (MPDU) that carries trigger information. A MPDU including trigger information may be one MPDU of an A-MPDU or may be one MPDU of a MU MIMO and MU OFDMA.

Even in an embodiment of FIG. 29, a TXOP duration field may be included in an HE-SIG-A field. However, information in which a MAC frame corresponding to trigger information or trigger information is included in the PPDU should be indicated. For example, information may indicate to include broadcast AID in the HE-SIG-B field and to enable a receiving STA to read an entire MAC header. Alternatively, by fixing a position of an MPDU that loads trigger information, the receiving STA may determine only a corresponding position to determine whether trigger information is included.

FIG. 30 is a diagram illustrating a UL MU frame and TXOP protection according to an embodiment of the present invention.

The UL MU frame at the left side of FIG. 30 represents a UL MU frame structure of an STA that transmits data to an area of a superordinate 10 MHz in a 20 MHz band. In an UL frame structure of FIG. 30, a HE-SIG-B field and a HE-SIG-C field may be omitted.

In an embodiment, a length field included in the L-SIG field may represent a TXOP length 1 from the UL frame to a transmitted and received ACK frame.

The HE-SIG-A field may include a length field representing a length 2-1 of a HE-SIG-B field. When the HE-SIG-C field exists, the HE-SIG-C field may represent a length 2-2 of the HE-SIG-C field. When the frame includes both the HE-SIG-B field and the HE-SIG-C field, the HE-SIG-A field may signal a length 2-1 of the HE-SIG-B field, and the HE-SIG-B field may signal a length 2-2 of the HE-SIG-C field.

A length field of the HE-SIG-A field may represent a length 3 of a current frame (PPDU). However, in an embodiment, a length of the UL MU frame may be already indicated in the trigger frame. In such a case, a length field of the HE-SIG-A field is a TXOP duration field and may indicate a length of an entire TXOP 4. Thereby, other STAs that do not recognize the trigger frame may decode a TXOP duration field included in the HE-SIG-A field to set NAV, and thus a TXOP of an UL MU data transmitting STA may be protected.

The TXOP duration field has been described with reference to FIG. 27. A TXOP interval of the UL MU frame, i.e., the remaining time/interval length of a frame exchange procedure may include a length of a subsequent frame, i.e., an ACK frame length. That is, a TXOP interval field of the UL MU frame may indicate a TXOP length including an ACK frame. As shown, the TXOP interval field of the UL MU frame may indicate a TXOP interval further including an IFS time between the UL MU frame and the ACK frame. In another embodiment, a TXOP interval indicated by a TXOP interval field included in the UL MU frame may further include the remaining signal frame portions after a signal field including the TXOP duration field.

Length information of the MAC header may indicate a TXOP length. When transmitting an MU frame, it is unnecessary that other STAs decode headers up to a MAC header of the MU frame. Therefore, length information of the MAC header may be used for other usage instead of using for NAV setting. For example, length information of the MAC header may indicate a length of actual data that subtract padding.

Because a subsequent ACK frame transmits MU AKC information, unlike a legacy ACK/BA frame, a length thereof may be extended. Therefore, the subsequent ACK frame should set a TXOP duration field such that a legacy STA and an 11ax STA set a NAV. A TXOP duration value in which a length field of the ACK frame, which is a final frame of the UL MU procedure represents is the same as the remaining lengths of both a 11ax frame and a legacy frame. Therefore, the TXOP duration field may be set to indicate the L-SIG length, the HE-SIG-A length, and a length to a final frame of the MAC header. In an embodiment, the TXOP duration of the ACK frame may be set to 0.

FIG. 31 is a diagram illustrating an STA apparatus according to an embodiment of the present invention.

In FIG. 31, the STA apparatus may include a memory 31010, a processor 31020, and a radio frequency (RF) unit 31030. As described above, the STA apparatus is a HE STA apparatus and may be an AP or a non-AP STA.

The RF unit 31030 is connected to the processor 31020 to transmit/receive a radio signal. The RF unit 31030 may up-convert data received from the processor in a transmitting and receiving band to transmit a signal.

The processor 31020 is connected to the RF unit 31030 to implement a physical layer and/or a MAC layer according to the IEEE 802.11 system. The processor 31020 may be configured to perform operations according to the various embodiments of the present invention shown in FIGS. 1 to 31. Furthermore, a module for implementing the operation of the STA according to the various embodiments of the present invention may be stored at the memory 31010 to be executed by the processor 31020.

The memory 31010 is connected to the processor 31020 to store various information for driving the processor 31020. The memory 31010 may be included in the processor 31020 or disposed outside the processor 31020 and may be connected to the processor 31020 by known means.

Furthermore, the STA apparatus may include a single antenna or multiple antennas. A detailed configuration of the STA apparatus of FIG. 31 may be implemented so that contents described in the various embodiments of the present invention are independently applied or so that two or more embodiments are simultaneously applied.

A method of transmitting and receiving data including receiving operating mode information of the STA apparatus of FIG. 31 will be again described with reference to the following flowchart.

FIG. 32 is a diagram illustrating a method of transmitting/receiving a UL MU according to an embodiment of the present invention.

FIG. 32 illustrates communication with a plurality of MU STAs that perform UL MU transmission with the AP STA. However, an operation of one STA of a plurality of MU STAs will be described.

In FIG. 32, the MU STAs receive a trigger frame from the AP STA (S32010). In other words, the AP STA transmits the trigger frame to the MU STAs (S32010). The trigger frame may include resource unit allocation information for OFDMA transmission. The resource unit may allocate, for example 26 tones to a most small unit.

The MU STAs may transmit an UL MU PPDU to the AP STA based on the trigger frame (S32020). In other words, the AP STA may receive an UL MU PPDU based on the trigger frame (S32020).

The MU STAs may receive an ACK frame of the UL MU PPDU (S32030). In other words, the AP STA may transmit an ACK frame of the received UL MU PPDU (S32030).

As shown in FIG. 27, the trigger frame may include a legacy preamble and a HE preamble, and the HE preamble may include a HE-SIG-A field and a HE-SIG-B field. The legacy preamble may include an L-STF, an L-LTF, and an L-SIG field.

The HE-SIG-A field of the trigger frame may include TXOP duration information/field representing a TXOP duration. The TXOP duration is a time interval for a frame exchange sequence of the STA. The frame exchange sequence of the STA may represent transmission and reception of a trigger frame, an UL MU PPDU, and an ACK frame.

The UL MU PPDU includes a legacy preamble and a HE preamble, and the HE preamble may include a HE-SIG-A field. The HE-SIG-A field of the UL MU PPDU may include TXOP duration information/field. A definition and usage of the TXOP duration is the same as those of a TXOP duration of the trigger frame. A TXOP duration of the UL MU PPDU is a TXOP length of the remaining duration after the UL MU PPDU and includes an ACK frame length. This is because a target of TXOP that should be protected in the STA that transmits the UL MU PPDU is an ACK frame transmitting interval after the UL MU PPDU.

The TXOP duration field of the trigger frame may represent a length in time from the trigger frame to the end of the ACK frame. Therefore, the TXOP duration of the trigger frame may include an IFS time between reception of the trigger frame and transmission of the UL MU PPDU, a length of the UL MU PPDU, and an ACK frame length and an IFS time between the UL MU PPDU transmission and ACK frame reception.

In another embodiment, the TXOP duration field of the trigger frame may represent a length in time from the end of the HE-SIG-A field of the trigger frame to the end of the ACK frame. Therefore, the TXOP duration of the trigger frame may include a length of the remaining portions after the HE-SIG-A field of the trigger frame, an IFS time between trigger frame reception and UL MU PPDU transmission, a length of the UL MU PPDU, and an ACK frame length and an IFS time between UL MU PPDU transmission and ACK frame reception.

The TXOP duration field of the UL MU PPDU frame may represent a length in time from the UL MU PPDU to the end of the ACK frame. Therefore, the TXOP duration of the UL MU PPDU may include an ACK frame length and an IFS time between UL MU PPDU transmission and ACK frame reception.

In another embodiment, the TXOP duration field of the UL MU PPDU frame may represent a length in time from the end of the HE-SIG-A field of the UL MU PPDU to the end of the ACK frame. Therefore, the TXOP duration of the UL MU PPDU may include a length of the remaining portions after the HE-SIG-A field of the UL MU PPDU and an ACK frame length and an IFS time between UL MU PPDU transmission and ACK frame reception.

The UL MU PPDU may include a HE-STF, a HE-LTF, and a data field. The HE-STF, the HE-LTF, and the data field of the UL MU PPDU may be transmitted through a bandwidth of a resource unit allocated to a corresponding STA.

In the aforementioned embodiments, elements and characteristics of the present invention have been combined in predetermined forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims having no explicit citation relation in the claims or may be included as a new claim by amendments after filing an application.

The embodiment of the present invention may be implemented by various means, for example, hardware, firmware, software or a combination thereof. In the case of implementations by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, the embodiment of the present invention may be implemented in the form of a module, procedure or function for performing the aforementioned functions or operations. A software code may be stored at the memory to be driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

In a wireless communication system of the present invention, an example in which an uplink single user or multi-user transmitting method is applied to an IEEE 802.11 system has been described, but the wireless communication system can be applied to various wireless communication systems in addition to the IEEE 802.11 system.

What is claimed is:

1. A method for receiving an uplink (UL) multi-user (MU) Physical Protocol Data Unit (PPDU) of an access point (AP) in a WLAN system, the method comprising:
   transmitting, to a plurality of station (STA)s, a trigger frame including resource unit allocation information for orthogonal frequency division multiple access (OFDMA) transmission and STA identifier (ID)s of the plurality of STAs;
   receiving a UL MU Physical Protocol Data Unit (PPDU) based on the trigger frame,
   wherein the UL MU PPDU includes a first legacy preamble and a first High Efficiency (HE) preamble, and the first HE preamble comprises a first HE-SIG-A field and a first HE-SIG-B field, and
   wherein the first HE-SIG-A field comprises first Transmission Opportunity (TXOP) duration information related to a first TXOP duration, and the first TXOP duration is set to include a time required to transmit the UL MU PPDU and the ACK frame; and
   transmitting an ACK frame of the UL MU PPDU.

2. The method of claim 1,
   wherein the UL MU PPDU comprises a second legacy preamble and a second HE preamble, and the second HE preamble comprises a second HE-SIG-A field, and
   wherein the second HE-SIG-A field comprises second TXOP duration information related to a second TXOP duration, and the second TXOP duration is set to include a time required to transmit the UL MU PPDU and the ACK frame.

3. The method of claim 1,
   wherein the first TXOP duration further comprises an Inter Frame Space (IFS) time between the trigger frame and the UL MU frame and an IFS time between the UL MU frame and the ACK frame.

4. The method of claim 2,
   wherein the second TXOP duration further comprises an IFS time between the UL MU PPDU and the ACK frame.

5. The method of claim 2,
   wherein the second HE preamble of the UL MU PPDU further comprises a High Efficiency-Short Training Field (HE-STF), and a HE-Long Training Field (HE-LTF), and
   wherein the HE-STF, the HE-LTF, and a data field of the UL MU PPDU are transmitted through a bandwidth of an allocated resource unit.

6. A access point (AP) for receiving an uplink (UL) multi-user (MU) Physical Protocol Data Unit (PPDU) in a WLAN system, the AP comprising:
   a Radio Frequency (RF) unit that transmits and receives a wireless signal; and
   a processor that controls the RF unit, wherein the processor is configured to,
   transmit, to a plurality of station (STA)s, a trigger frame including resource unit allocation information for orthogonal frequency division multiple access (OFDMA) transmission and STA identifier (ID)s of the plurality of STAs,
   wherein the trigger frame includes a first legacy preamble and a first High Efficiency (HE) preamble, and the first HE preamble comprises a first HE-SIG-A field and a first HE-SIG-B field, and
   wherein the first HE-SIG-A field comprises first Transmission Opportunity (TXOP) duration information related to a first TXOP duration, and the first TXOP duration is set to include a time required to transmit the UL MU PPDU and the ACK frame,
   receive a UL MU Physical Protocol Data Unit (PPDU) based on the trigger frame, and
   transmit an ACK frame of the UL MU PPDU.

7. The AP of claim 6,
   wherein the UL MU PPDU comprises a second legacy preamble and a second HE preamble, and the second HE preamble comprises a second HE-SIG-A field, and
   wherein the second HE-SIG-A field comprises second TXOP duration information related to a second TXOP duration, and the second TXOP duration is set to include a time required to transmit the UL MU PPDU and the ACK frame.

8. The AP of claim 6,
   wherein the first TXOP duration further comprises an Inter Frame Space (IFS) time between the trigger frame and the UL MU frame and an IFS time between the UL MU frame and the ACK frame.

9. The AP of claim 7,
   wherein the second TXOP duration further comprises an IFS time between the UL MU PPDU and the ACK frame.

10. The AP of claim 7,
    wherein the second HE preamble of the UL MU PPDU further comprises a High Efficiency-Short Training Field (HE-STF), and a HE-Long Training Field (HE-LTF), and
    wherein the HE-STF, the HE-LTF, and a data field of the UL MU PPDU are transmitted through a bandwidth of an allocated resource unit.

* * * * *